(12) United States Patent
De Angelis et al.

(10) Patent No.: US 10,899,650 B2
(45) Date of Patent: Jan. 26, 2021

(54) METHODS AND APPARATUS FOR PROCESSING GLASS

(71) Applicant: CORNING INCORPORATED, Corning, NY (US)

(72) Inventors: Gilbert De Angelis, Lindley, NY (US); Olivier Fournel, Yerres (FR); Allan Mark Fredholm, Vulaines sur Seine (FR); Chunhong Chelsie He, Horseheads, NY (US); Bruno Le Gallic, Fontainebleau (FR); Yuehao Li, Painted Post, NY (US); David Posada-Pineda, Ithaca, NY (US); Xavier Tellier, Avon (FR)

(73) Assignee: Corning Incorporated, Corning, NY (US)

( * ) Notice: Subject to any disclaimer, the term of this patent is extended or adjusted under 35 U.S.C. 154(b) by 190 days.

(21) Appl. No.: 16/098,298

(22) PCT Filed: May 3, 2017

(86) PCT No.: PCT/US2017/030708
§ 371 (c)(1),
(2) Date: Nov. 1, 2018

(87) PCT Pub. No.: WO2017/192634
PCT Pub. Date: Nov. 9, 2017

(65) Prior Publication Data
US 2019/0144324 A1 May 16, 2019

Related U.S. Application Data

(60) Provisional application No. 62/469,232, filed on Mar. 9, 2017, provisional application No. 62/347,365, filed on (Continued)

(51) Int. Cl.
*C03B 17/06* (2006.01)
*C03B 13/00* (2006.01)
*C03B 13/04* (2006.01)

(52) U.S. Cl.
CPC .......... *C03B 17/068* (2013.01); *C03B 13/00* (2013.01); *C03B 13/04* (2013.01); *C03B 17/064* (2013.01)

(58) Field of Classification Search
CPC ..... C03B 17/06; C03B 17/061; C03B 17/067; C03B 17/068
See application file for complete search history.

(56) References Cited

U.S. PATENT DOCUMENTS 1,692,615 A * 11/1928 Blair ...................... C03B 17/06
65/91
1,759,229 A 5/1930 Drake
(Continued)

FOREIGN PATENT DOCUMENTS

JP       10324531 A * 12/1998 ............. C03B 17/06
JP   2000335924 A * 12/2000 ............. C03B 17/06
(Continued)

OTHER PUBLICATIONS

JP2001089022A Google Patents Machine Translation Performed Jun. 23, 2020. (Year: 2020).*
(Continued)

*Primary Examiner* — Lisa L Herring
(74) *Attorney, Agent, or Firm* — Ryan T. Hardee

(57) ABSTRACT

Disclosed is an apparatus and method of making molten glass. The apparatus includes a glass former having a slot orifice design to deliver a glass ribbon. The slot orifice design can include a transition section, a slot extension, and external structural reinforcements. In some embodiments, the orifice opening distance of the slot extension varies along the width of the orifice. In some embodiments, the orifice has an orifice opening distance that is smaller at the center of the slot extension than at the edges of the slot extension, which limits glass flow at the center of the slot
(Continued)

extension. Also disclosed is a method of making glass using the disclosed apparatus.

12 Claims, 37 Drawing Sheets

Related U.S. Application Data on Jun. 8, 2016, provisional application No. 62/331,021, filed on May 3, 2016.

(56) References Cited

U.S. PATENT DOCUMENTS

| | | | |
|---|---|---|---|
| 1,865,843 | A | 7/1932 | Drake |
| 2009/0019892 | A1 | 1/2009 | Fredholm et al. |
| 2018/0072602 | A1 | 3/2018 | De Angelis et al. |
| 2019/0152825 | A1* | 5/2019 | Fournel ............... C03B 17/064 |

FOREIGN PATENT DOCUMENTS

| | | | | | |
|---|---|---|---|---|---|
| JP | 2001080922 | A | * | 3/2001 | ........... C03B 17/064 |
| TW | M452173 | U | * | 5/2013 | |

OTHER PUBLICATIONS

JP10324531A Google Patents Machine Translation Performed Jun. 23, 2020. (Year: 2020).*
TWM452173U—Taiwanese Patent Office Google Machine Translation—Performed Sep. 29, 2020. (Year: 2020).*
JP2000-335924A—Google Patents Machine Translation—Performed Sep. 29, 2020. (Year: 2020).*
International Search Report and Written Opinion of the International Searching Aurthority; PCT/US2017/030708; dated Jul. 20, 2017; 14 Pages; European Patent Office.

* cited by examiner

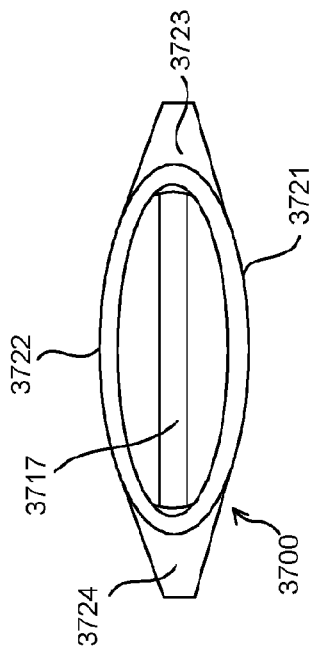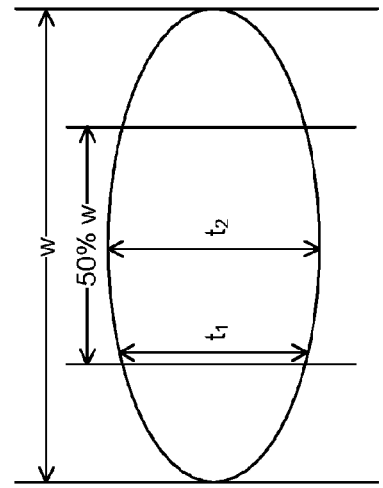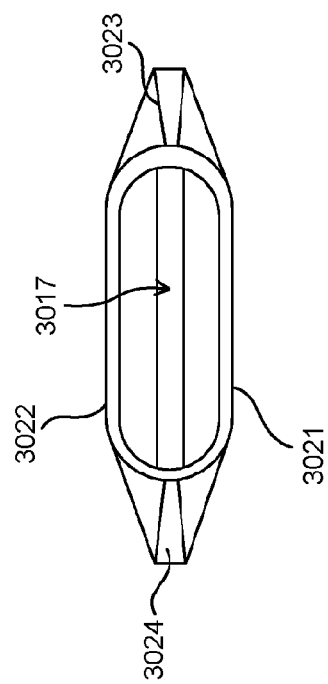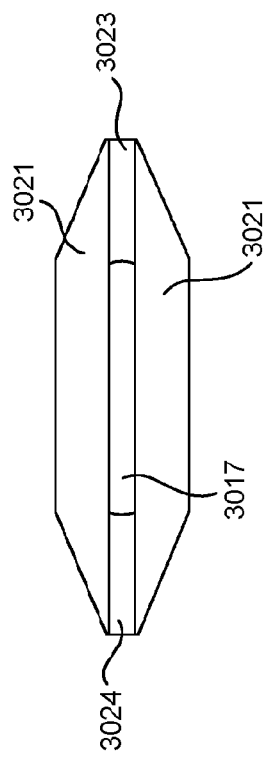
FIG. 37
FIG. 38
FIG. 35
FIG. 36

METHODS AND APPARATUS FOR PROCESSING GLASS

CROSS-REFERENCE TO RELATED APPLICATIONS

This application claims the benefit of priority under 35 U.S.C. § 371 of International Patent Application Serial No. PCT/US2017/030708, filed on May 3, 2017, which in turn, claims the benefit of priority of U.S. Provisional Patent Application Ser. No. 62/469,232 filed on Mar. 9, 2017, U.S. Provisional Patent Application Ser. No. 62/347,365 filed on Jun. 8, 2016 and U.S. Provisional Patent Application Ser. No. 62/331,021 filed on May 3, 2016, the contents of each of which are relied upon and incorporated herein by reference in their entireties.

BACKGROUND

Field

Embodiments of the present disclosure relate to forming a ribbon of glass from a molten supply.

Background

Sheet glass is formed from a ribbon of glass and is sought after for use in user interfaces, controls, displays, architectural devices, appliances, and electronic devices. These types of uses can benefit from a glass sheet than can resist impact and breakage.

SUMMARY

In one embodiment, a glass forming apparatus comprises an upper transition member comprising a transition chamber, and a pressure tank attached to the upper transition member, the pressure tank comprising an upper orifice and a lower orifice, such that a chamber within the pressure tank is in fluid communication with the transition chamber.

The glass forming apparatus can further include an upper pressure tank support positioned across the upper orifice, a lower pressure tank support positioned across the lower orifice, and a slot extension attached to the pressure tank such that an interior volume of the slot extension is in fluid communication with the pressure tank. The glass forming apparatus can also include a second upper pressure tank support positioned across the upper orifice. The glass ribbon forming apparatus can further include a second lower pressure tank support positioned across the lower orifice.

The upper orifice can include a first upper aperture and a second upper aperture and an upper pressure tank support integrally formed in a wall of the pressure tank. The upper pressure tank support can be positioned between the first upper aperture and the second upper aperture. Additionally, the lower orifice can include a first lower aperture and a second lower aperture and a lower pressure tank support integrally formed in a wall of the pressure tank. The lower pressure tank support can be positioned between the first lower aperture and the second lower aperture.

In some embodiments, the apparatus can include a heat source. For example, the heat source can be the slot extension wherein a first end of the slot extension is configured to receive a first electrical connection and a second end of the slot extension is configured to receive a second electrical connection.

The glass forming apparatus can include an upper transition member support positioned across the transition chamber. For example, the upper transition member support can be fixed to the upper transition member by a metallurgic bond.

The slot extension can have a height in a range from about 1 millimeter (mm) to about 100 mm.

The pressure tank can include an end dimension extending along an end plane, the end plane being parallel to a first end of the pressure tank; a width extending between the first end and a second end of the pressure tank; and an opening dimension along an opening direction, the opening direction being parallel to the end plane and perpendicular to the width. An interior opening dimension of the pressure tank can be greater than an opening distance of the lower orifice. In some embodiments, the interior opening dimension distance can be in a range from about two to about ten times greater than the opening distance of the lower orifice.

In some embodiments, the pressure tank can have a cylindrical shape, where a longitudinal axis of the pressure tank extends along a width of a lower end of the upper transition member, the lower orifice has a width and an opening distance, and a diameter of the pressure tank is greater than the opening distance of the lower orifice.

The upper transition member can have an upper end having a width such that a width of the lower end is greater than a width of the upper end. In some embodiments, an opening distance of the upper end can be greater than an opening distance of the lower end.

In some embodiments, the lower orifice can have a width from about 50 mm to about 1.5 meters (m). In some embodiments, the lower orifice can have a width from about 150 mm to about 300 mm.

In accordance with the present disclosure, a process for forming a glass ribbon is disclosed comprising supplying a stream of molten glass to a pressure tank through an upper orifice of the pressure tank, the pressure tank redistributing the molten glass from a center of the pressure tank to a first end of the pressure tank and a second end of the pressure tank opposite the first end, and passing the stream of molten glass through a lower orifice of the pressure tank. The glass forming process can further include separating the molten glass into a plurality of molten glass flows with a lower pressure tank support, and passing the plurality of flows into a slot extension. Additionally, the method may further comprise fusing the plurality of flows of molten glass into a single flow of molten glass within the slot extension, and drawing a glass ribbon from the slot extension. The process can further include heating the stream of molten glass within the slot extension. In some embodiments, the glass ribbon can be further directed between two rolls used in a glass roller process.

The pressure tank can include an upper pressure tank support positioned across the upper orifice, and a lower pressure tank support can be positioned across the lower orifice. In some embodiments, the lower orifice can include a first lower aperture and a second lower aperture. The lower pressure tank support can be positioned between the first lower aperture and the second lower aperture. The lower pressure tank support can be integrally formed in a wall of the pressure tank.

In some embodiments, a height of the slot extension can be in a range from about 1 mm to about 100 mm. In some embodiments, the pressure tank can include a width extending between a first end and a second end of the pressure tank, the width extending along a direction parallel to a flow plane of the molten glass; and an opening dimension along an opening direction, the opening direction being perpendicular to the flow plane of the molten glass. An interior opening dimension of the pressure tank can be greater than an opening distance of the lower orifice. In some embodiments, the interior opening dimension distance of the pressure tank can be a range from about two to about ten times greater than the opening dimension distance of the lower orifice. In some embodiments, the pressure tank can comprise a cylindrical shape. The lower orifice can have a width and an opening distance and a longitudinal axis of the cylinder can extend along the width of the pressure tank. A diameter of the pressure tank cylinder can be greater than the opening distance of the lower orifice, A flow density of the molten glass through the lower orifice can be from approximately one kilogram per centimeter per hour to approximately 36 kilograms per centimeter per hour. A viscosity of the molten glass can be from approximately 50 poises to approximately 35,000 poises.

In some embodiments, the glass forming process can include feeding the stream of molten glass through a transition chamber of an upper transition member prior to feeding the stream of molten glass into the pressure tank. The upper transition member can include an upper end fixed to a molten glass supply and a lower end fixed to the pressure tank. The upper transition member can include an upper transition member support positioned across the transition chamber.

In an embodiment, glass forming apparatus comprises a transition member including a transition chamber, a slot extension attached to the transition member such that an interior volume of the slot extension is in fluid communication with the transition chamber, and a mechanical reinforcement chosen from one of a first strut or a ridge, the mechanical reinforcement can be attached to an exterior surface of the slot extension. The mechanical reinforcement can be a first strut attached to a first exterior surface of the slot extension and extending outward from the first exterior surface, and a second strut attached to a second exterior surface of the slot extension and extending outward form the second exterior surface.

The glass forming apparatus can further include a third strut attached to the exterior surface and extending outward from the first exterior surface. The third strut can be spaced from the first strut along a width of the slot extension. The glass forming apparatus can include a fourth strut attached to the second exterior surface and extending outward from the second exterior surface. The fourth strut can be spaced from the second strut along the width of the slot extension.

The first strut of the glass forming apparatus comprises a first strut body positioned between a first slot end and a first reinforcement end. The first slot end can be positioned adjacent the first exterior surface. The first strut can be configured to transmit stress from the first exterior surface to the first reinforcement end. The second strut of the glass forming apparatus comprises a second strut body positioned between a second slot end and a second reinforcement end. The second slot end can be positioned adjacent the second exterior surface. The second strut can be configured to transmit stress from the second exterior surface to the second reinforcement end. A surface area of the first reinforcement end can be greater than a surface area of the first slot end. A surface area of the second reinforcement end can be greater than a surface area of the second slot end.

The first strut of the glass forming apparatus can be angled upward with respect to a plane formed by a bottom of the slot extension. An angle of the first strut with respect to the plane can be in a range from about 10 degrees to about 30 degrees. The angle can be about 20 degrees. The second strut of the glass forming apparatus can be angled upward with respect to a plane formed by a bottom of the slot extension. An angle of the second strut with respect to the plane can be in a range from about 10 degrees to about 30 degrees. The angle can be about 15 to 25 degrees.

In some embodiments, the glass forming apparatus can include an upper ridge attached to the first exterior surface and the second exterior surface. The upper ridge can be vertically spaced on the slot extension. The lower ridge and/or the upper ridge can surround the slot extension. In some embodiments, a first bar can be positioned between the upper ridge and the lower ridge. The first bar can be positioned adjacent the first exterior surface of the slot extension. A second bar can be positioned between the upper ridge and the lower ridge. The second bar can be positioned adjacent the second exterior surface.

In some embodiments, the glass forming apparatus further comprises an upper flange and a lower flange. The upper flange can be attached to the exterior of the transition member at an upper portion of the transition member, and the lower flange can be attached to the exterior of the slot extension.

In an embodiment, the slot extension comprises a bottom orifice at its bottom portion. The orifice can be tapered from an orifice end to an orifice middle such that an end opening distance is greater than a middle opening distance.

In some embodiments, the mechanical reinforcement for the slot extension can be a ridge attached to a first exterior surface of the slot extension and a second exterior surface of the slot extension. The glass forming apparatus can include a lower ridge attached to the first exterior surface and the second exterior surface, where the ridge and the lower ridge are vertically spaced on the slot extension. The ridge and/or the lower ridge can surround the slot extension. A first bar can be positioned between the ridge and the lower ridge. The first bar can be positioned adjacent the first exterior surface. The glass forming apparatus can include a second bar positioned between the upper ridge and the lower ridge. The second bar can be positioned adjacent the second exterior surface.

In accordance with the present disclosure, a process for forming a glass ribbon is disclosed comprising supplying a stream of molten glass through a transition chamber of a transition member, passing the molten glass stream into a slot extension that is reinforced by a mechanical reinforcement chosen from one of a first strut or a ridge. The mechanical reinforcement can be attached to an exterior surface of the slot extension. The process can include drawing a glass ribbon from the slot extension.

In some embodiments, the mechanical reinforcement can be a first strut extending outward from the first side. The slot extension can be reinforced on a second side by a second strut extending outward from the second side. The first strut and the second strut can be angled upward with respect to a plane formed by a bottom of the slot extension. A first angle of the first strut and a second angle of the second strut with respect to the plane can be in a range from about 10 degrees to about 30 degrees. The first angle and the second angle can be about 20 degrees.

The glass forming process can further comprise directing the glass ribbon between two rolls used in a glass roller process.

In some embodiments, the slot extension comprises a bottom orifice at its bottom portion. The orifice can be tapered from an orifice end to an orifice middle such that an end opening distance is greater than a middle opening distance.

In some embodiments, the process further comprises establishing an electric current in the transition member and the slot extension by supplying an electric current to a first flange attached to the transition member and a second flange attached to the slot extension.

In some embodiments, slot extension can be reinforced by a ridge attached to the first exterior surface and the second exterior surface. The ridge can surround the slot extension. The slot extension can be reinforced by a lower ridge vertically spaced from the ridge on the slot extension. The slot extension can be reinforced by a first bar positioned between the ridge and the lower ridge. The first bar can be positioned adjacent the first exterior surface.

In some embodiments, the mechanical reinforcement can be a ridge attached to a first exterior surface of the slot extension and a second exterior surface of the slot extension. The slot extension can be reinforced by a lower ridge attached to the first exterior surface and the second exterior surface. The ridge and the lower ridge can be vertically spaced on the slot extension. The slot extension can be reinforced by a first bar positioned between the ridge and the lower ridge. The first bar can be positioned adjacent the first exterior surface.

In some embodiments, the embodiments of any of the preceding paragraphs may further include the transition chamber and an upper portion of the slot extension is covered by a refractory material, and a lower portion of the slot extension is not covered by a refractory material.

In some embodiments, the embodiments of any of the preceding paragraphs may further include wherein the upper portion has a height of at least 1 mm.

In some embodiments, the embodiments of any of the preceding paragraphs may further include wherein the lower portion has a height of at least 1 mm.

In some embodiments, the embodiments of any of the preceding paragraphs may further include wherein the mechanical reinforcement comprises a plurality of struts and the refractory material covers the strut.

In some embodiments, the embodiments of any of the preceding paragraphs may further include wherein the mechanical reinforcement comprises a plurality of struts and the plurality of struts are embedded in the refractory material.

In some embodiments, the embodiments of any of the preceding paragraphs may further include wherein a bottom portion of the slot extension comprises a bottom orifice, the bottom orifice having an orifice opening distance that varies along the width of the orifice.

In some embodiments, the embodiments of any of the preceding paragraphs may further include wherein the orifice opening distance has a local minimum in a middle portion of the bottom orifice; the orifice opening distance increases in a first direction moving away from the local minimum along the width of the orifice to a first local maximum in a first end portion of the bottom orifice; and the orifice opening distance increases in a second direction moving away from the local minimum along the width of the orifice to a second local maximum in a second end portion of the bottom orifice.

In some embodiments, the embodiments of any of the preceding paragraphs may further include wherein the orifice opening distance increases smoothly in the first direction moving away from the local minimum along the width of the orifice to the first local maximum, then smoothly decreases to the first end portion of the bottom orifice; and the orifice opening distance increases smoothly in the second direction moving away from the local minimum along the width of the orifice to the second local maximum, then smoothly decreases to the second end portion of the bottom orifice.

In some embodiments, the embodiments of any of the preceding paragraphs may further include wherein the orifice opening distances at the first and second local maxima are both at least 1% greater than the orifice opening distance at the local minimum.

In some embodiments, the embodiments of any of the preceding paragraphs may further include a lower flange and an upper flange configured to run current through the transition member, wherein the transition member comprises walls with variable thickness.

In some embodiments, the embodiments of any of the preceding paragraphs may further include wherein the transition member comprises walls with variable thickness configured to maintain glass temperature in the transition chamber via resistive heating such that average glass temperature varies by less than 1° C. as glass moves through the transition chamber under normal operating conditions.

In some embodiments, the embodiments of any of the preceding paragraphs may further include wherein the transition member comprises walls with variable thickness configured to avoid hot spots and power concentrations throughout the glass forming apparatus.

In some embodiments, the embodiments of any of the preceding paragraphs may further include wherein the lower flange comprises a U-shaped end engaged with an end portion of the slot extension.

In some embodiments, the embodiments of any of the preceding paragraphs may further include wherein the U-shaped end is configured to distribute current to the slot extension.

In some embodiments, the embodiments of any of the preceding paragraphs may further include wherein the mechanical reinforcement comprises a plurality of struts, and wherein the plurality of struts are configured to provide structural rigidity to the slot extension.

In some embodiments, the embodiments of any of the preceding paragraphs may further include wherein the slot extension is defined by a first slot wall and a second slot wall in the direction of the slot width, and a first slot end and a second slot end in the direction of the slot thickness; and the transition chamber is defined by: a first body portion connected to the first slot wall along the width of the slot and extending upward from the slot; a second body portion connected to the second slot wall along the width of the slot and extending upward from the slot; a first edge portion connected to the first slot end along the thickness of the slot and extending upward from the slot; and a second edge portion connected to the second slot end along the thickness of the slot and extending upward from the slot; wherein the first body portion is connected to the second body portion at a first end by the first edge portion, and the first body portion is connected to the second body portion at a second end by the second edge portion; the thickness of the transition chamber at a first predetermined height is the maximum distance between the first and second body portions in the thickness direction at that height; the thickness of the transition chamber increases as a function of height as distance from the slot increases in the height direction; the width of the transition chamber at a second predetermined height is the maximum distance between the first and second edge portions in the width direction at that height; the width of the transition chamber decreases as a function of height as distance from the slot increases in the height direction; the thickness of the transition chamber at any given height of the transition chamber does not vary by more than 5% along 50% of the width of the transition chamber at that height.

In some embodiments, the embodiments of any of the preceding paragraphs may further include wherein the thickness of the transition chamber increases linearly as a function of height as distance from the slot increases in the height direction, and the width of the transition chamber decreases linearly as a function of height as distance from the slot increases in the height direction.

In some embodiments, the embodiments of any of the preceding paragraphs may further include wherein the first body portion and the second body portion each have a thickness that is less than a thickness of each of the first edge portion and second edge portion.

In some embodiments, the embodiments of any of the preceding paragraphs may further include wherein the first body portion and the second body portion each have a thickness that is greater than a thickness of each of the first edge portion and second edge portion.

In some embodiments, the embodiments of any of the preceding paragraphs may further include wherein the first slot wall, second slot wall, first slot end, and second slot end have a thickness that is greater than a thickness of each of the first body portion, second body portion, first edge portion connected to the first slot end along the thickness of the slot and extending upward from the slot, and a second edge portion.

Further features and advantages of embodiments of the disclosure, as well as the structure and operation of various embodiments of the disclosure, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

Figure 19:
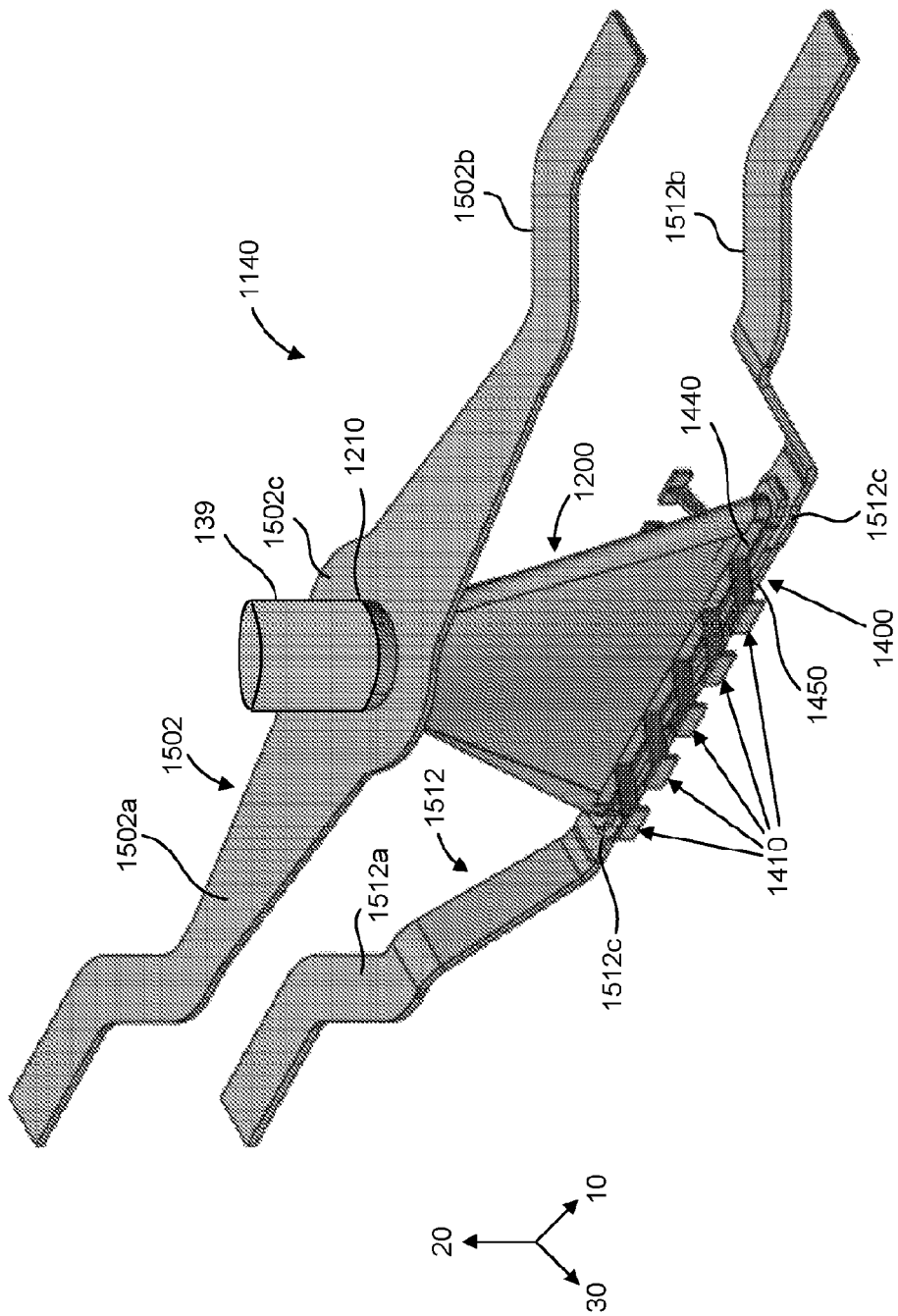
FIG. 19 is a perspective view of another glass forming apparatus according to the present disclosure.
Figure 22:
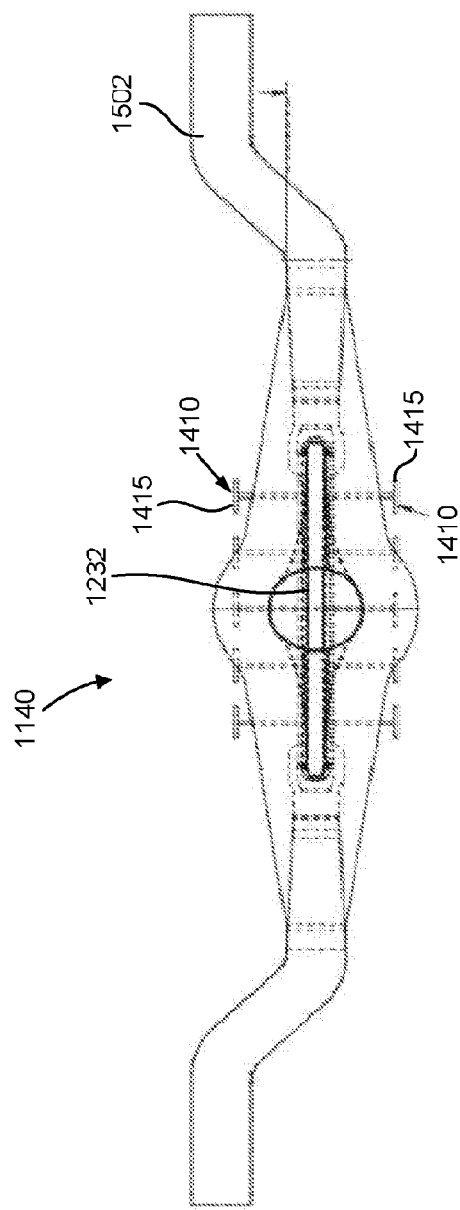
Figure 23:
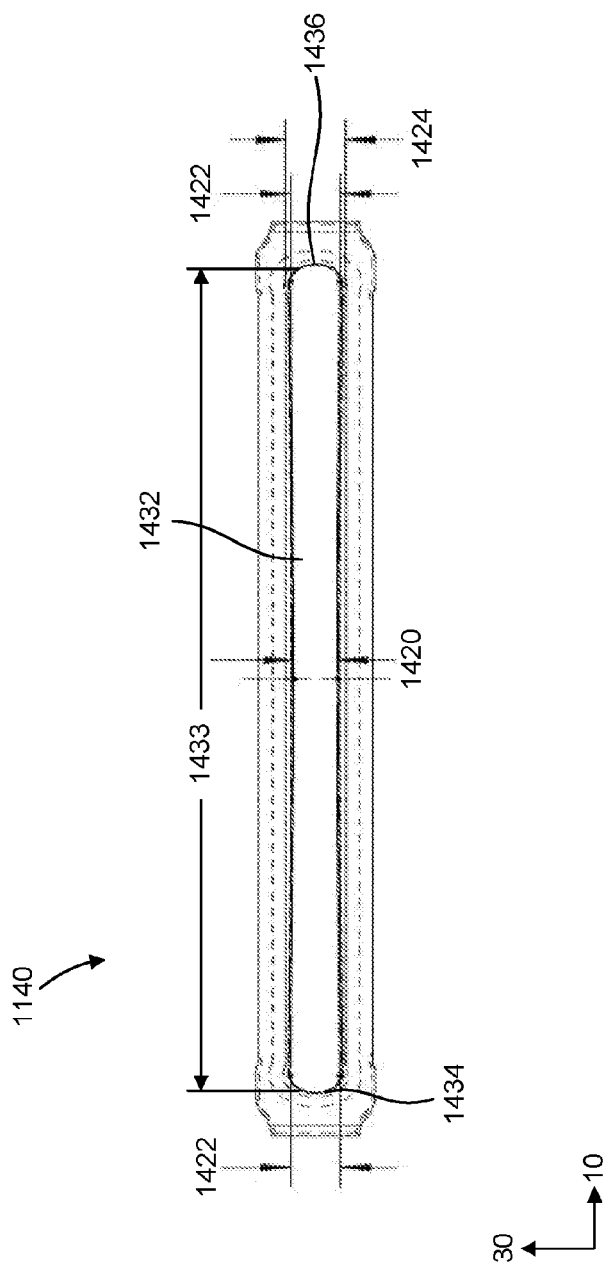
Figure 24:
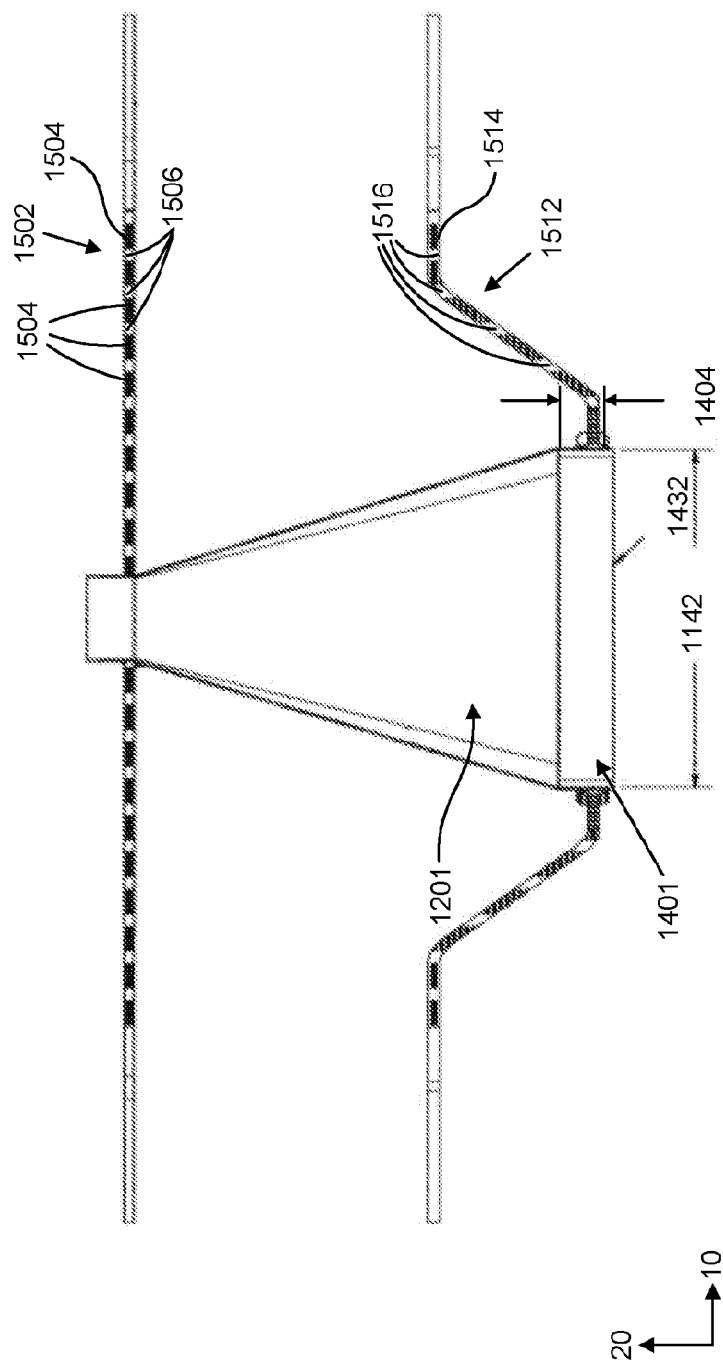
Figure 25:
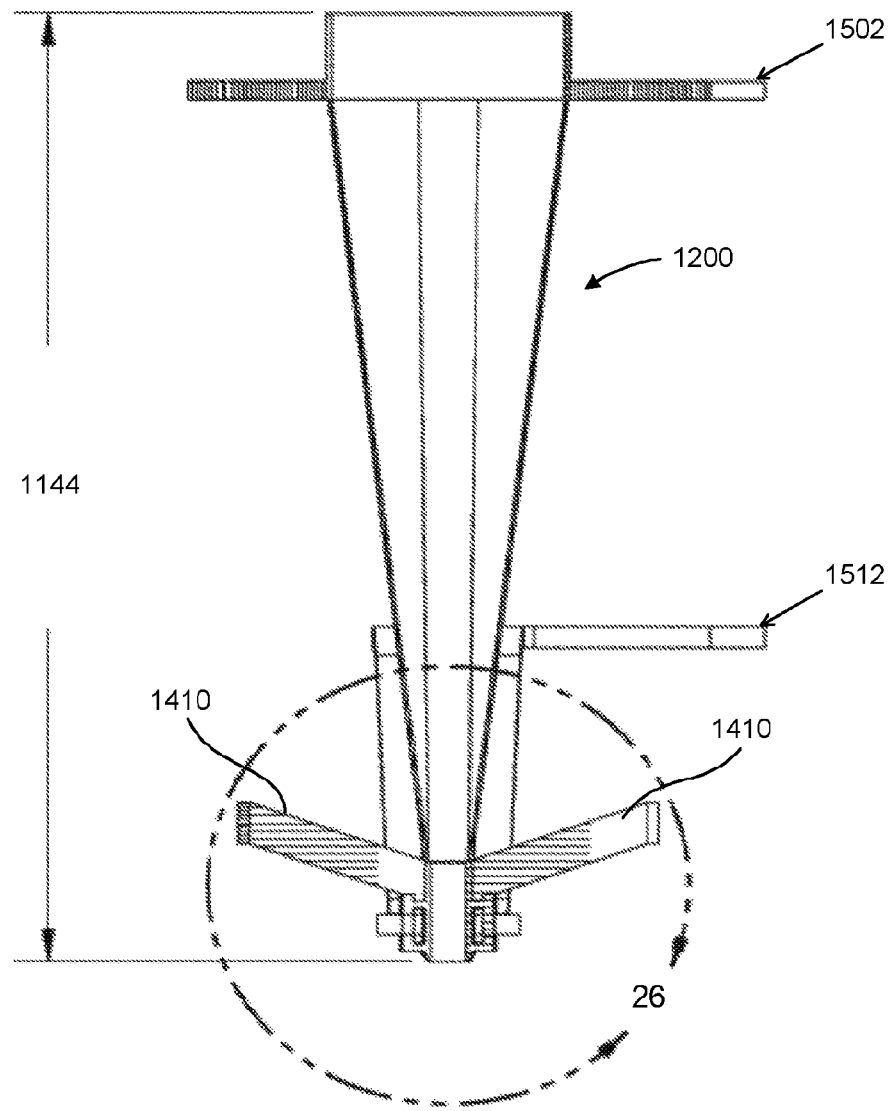
Figure 26:
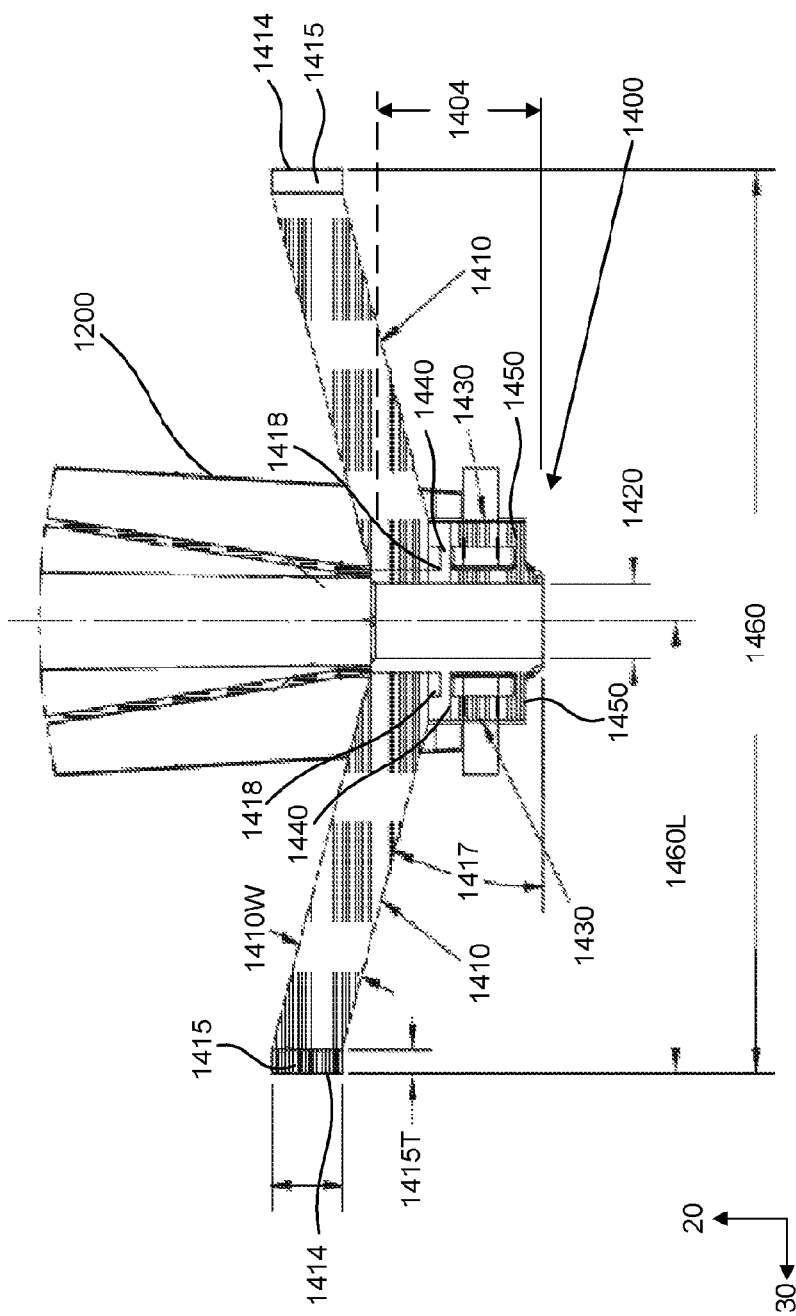
Figure 27:
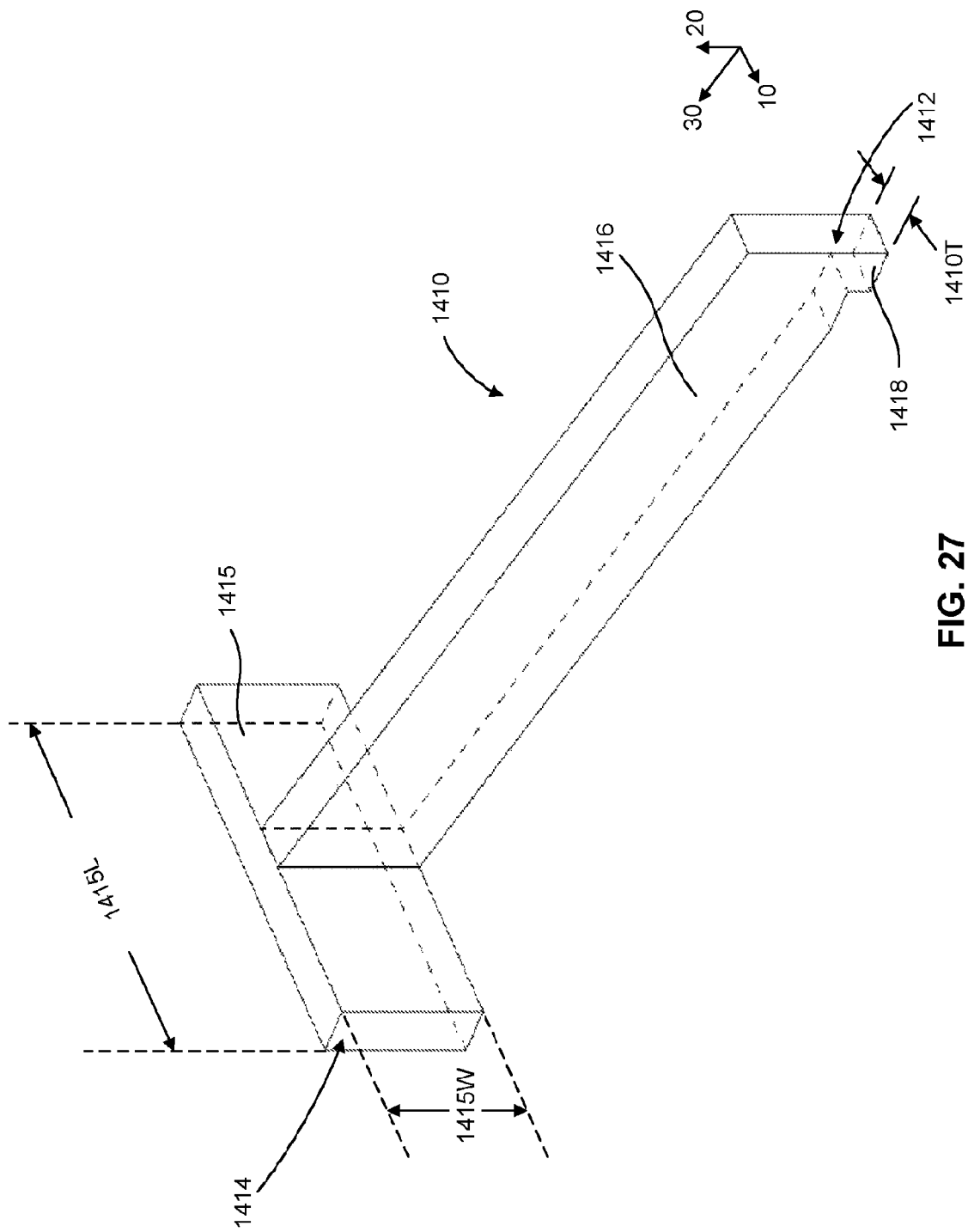
Figure 28:
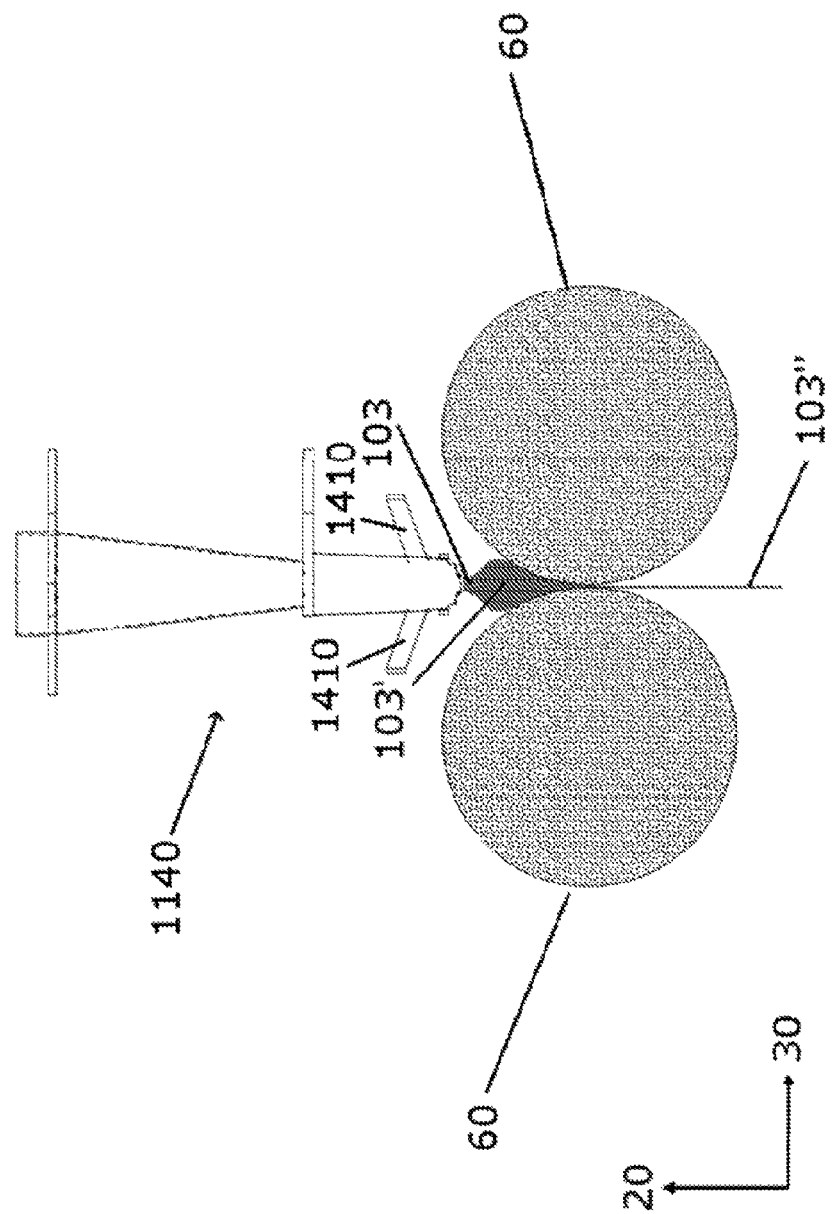
Figure 29:
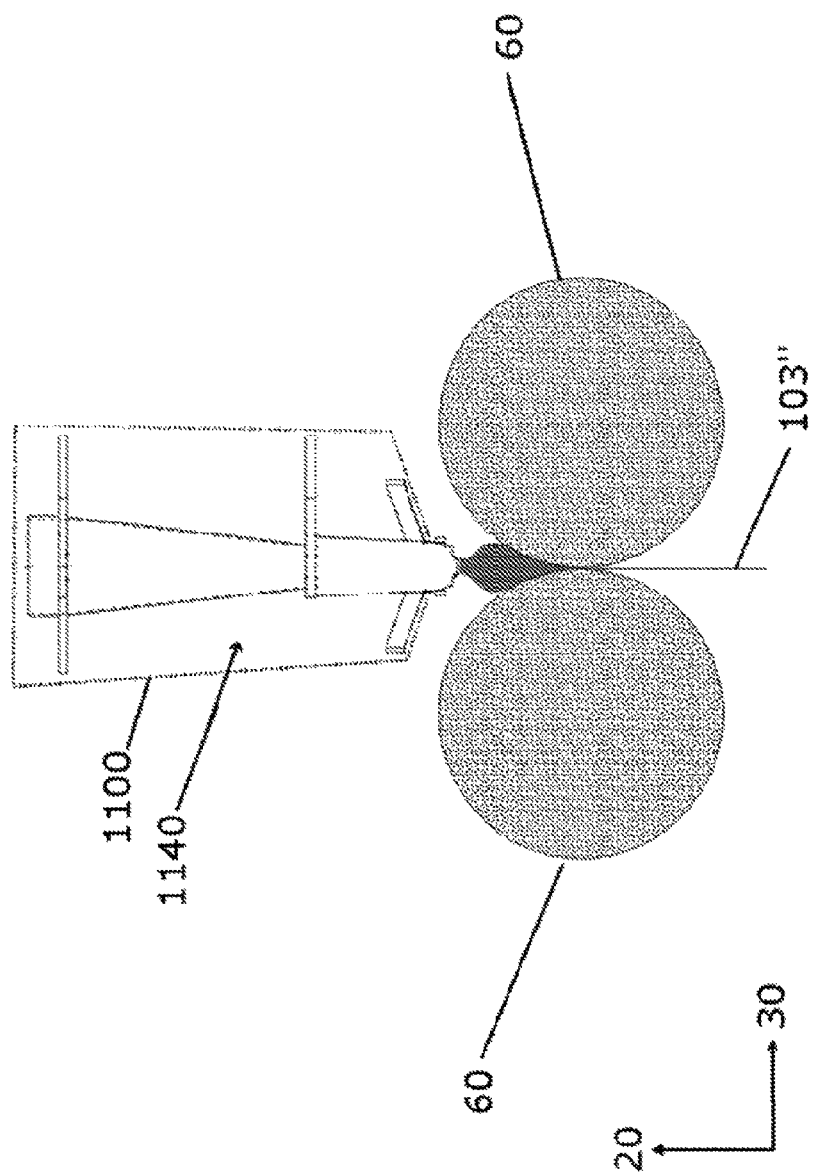

FIG. 22. Is a top view of the glass forming apparatus of FIG. 19;

FIG. 23 is a bottom view of the slot extension of the glass forming apparatus of FIG. 19;

FIG. 24 is a front section view of the glass forming apparatus of FIG. 19;

FIG. 25 is a side section view of the glass forming apparatus of FIG. 19;

FIG. 26 is a side detail section view of the glass forming apparatus of FIG. 19;

FIG. 27 is a perspective view of a strut of the glass forming apparatus of FIG. 19;

FIG. 28 is a side view of the glass forming apparatus of FIG. 19 including forming rolls;

FIG. 29 is a side view of the glass forming apparatus of FIG. 19 including forming rolls and a refractory material.

Figure 30:
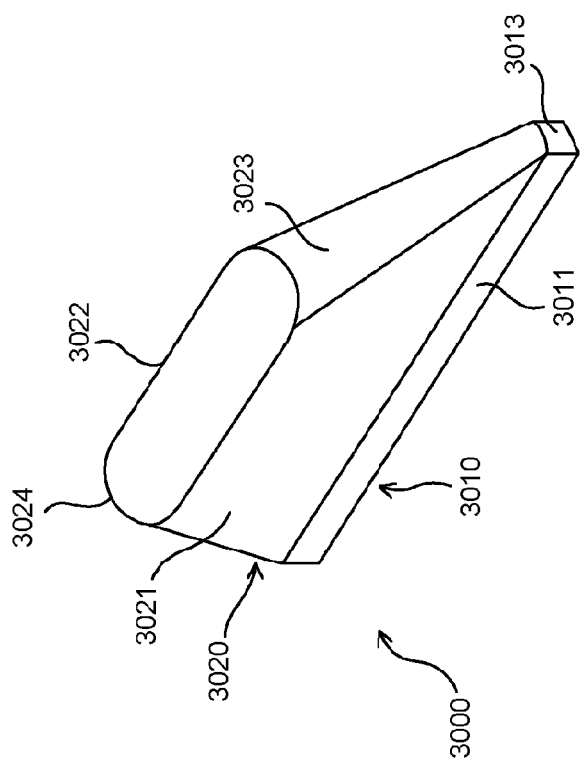

FIG. 30 is perspective view of an exemplary glass forming apparatus.

Figure 31:
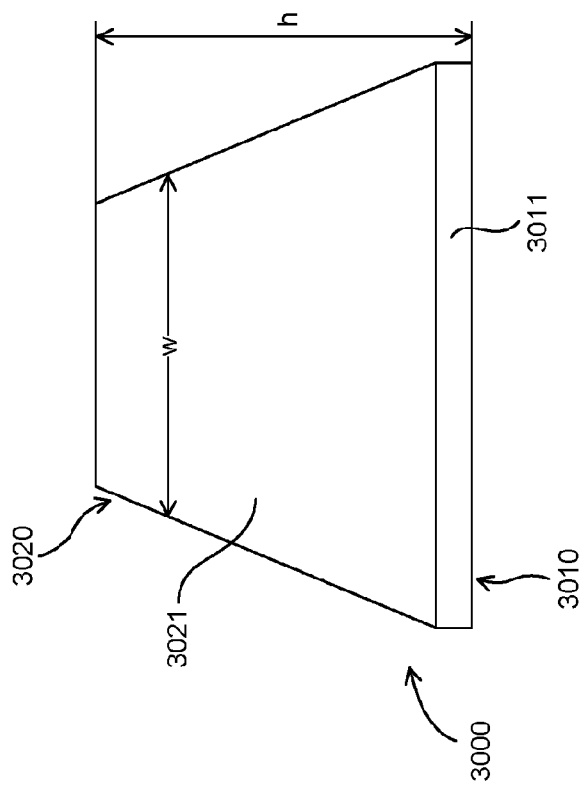

FIG. 31 is a front view of the glass forming apparatus of FIG. 30.

Figure 32:
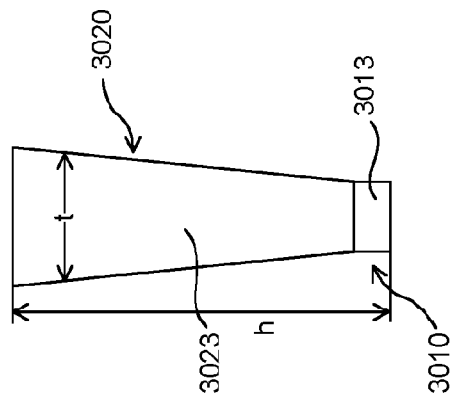

FIG. 32 is a side view of the glass forming apparatus of FIG. 30.

Figure 33:
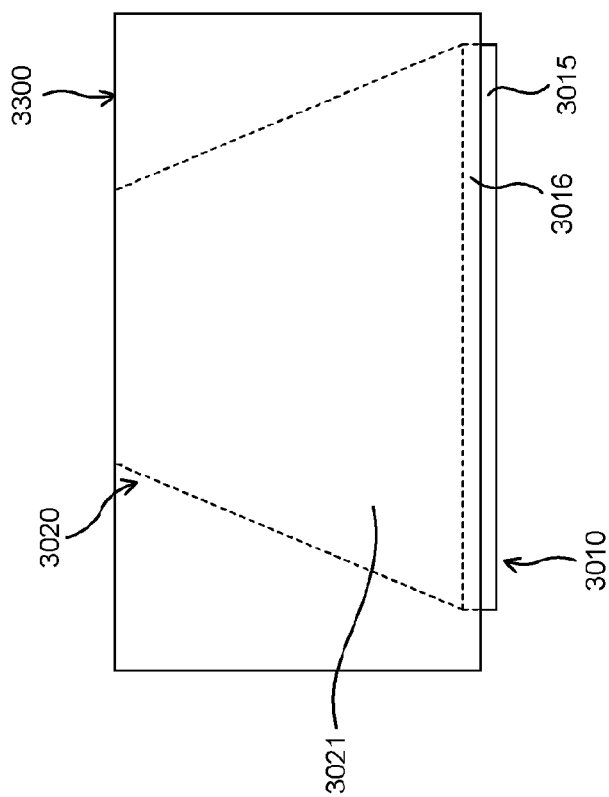

FIG. 33 is a front view of the glass forming apparatus of FIG. 30 covered by a refractory material.

Figure 34:
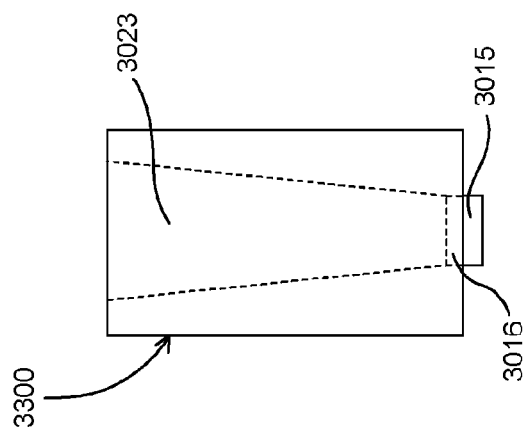

FIG. 34 is a side view of the glass forming apparatus of FIG. 30 covered by a refractory material.

FIG. 35 is a top view of the glass forming apparatus of FIG. 30.

FIG. 36 is a bottom view of the glass forming apparatus of FIG. 30.

FIG. 37 is a top view of a glass forming apparatus.

FIG. 38 is a schematic of a cross-section of the glass forming apparatus of FIG. 37.

Figure 39:
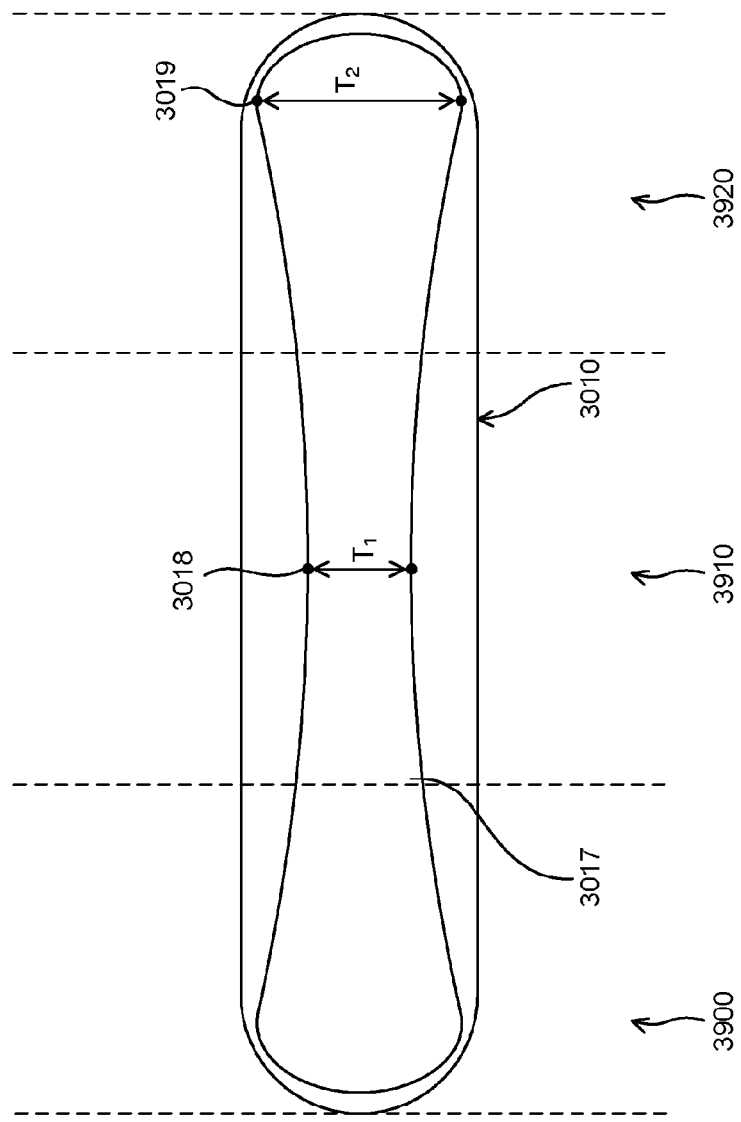

FIG. 39 is a schematic of the bottom of the slot extension of a glass forming apparatus.

Figure 40:
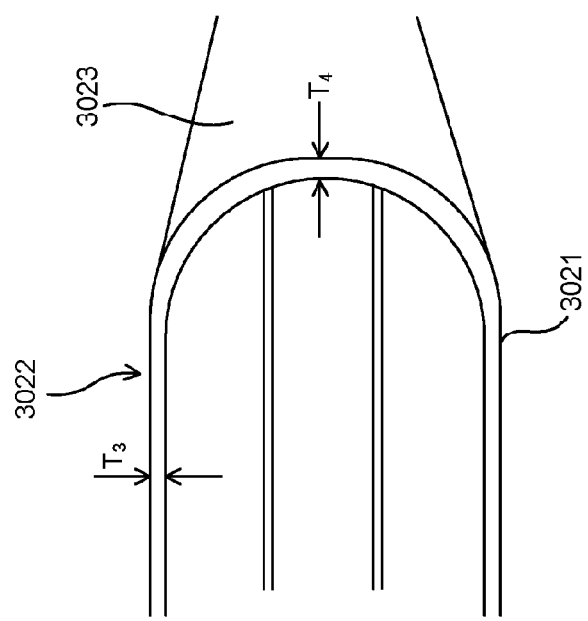

FIG. 40 is a schematic of a glass forming apparatus having variable wall thickness.

Figure 41:
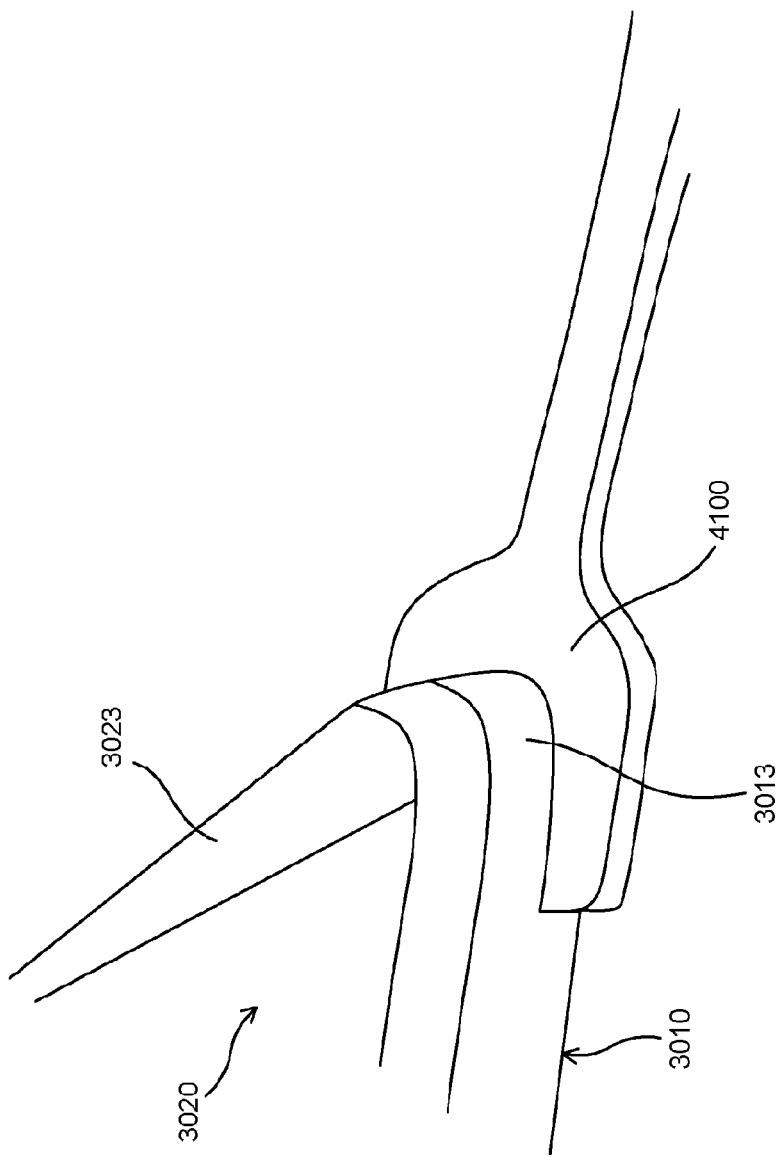

FIG. 41 shows a perspective view of a lower flange having a U-shaped end.

Figure 42:
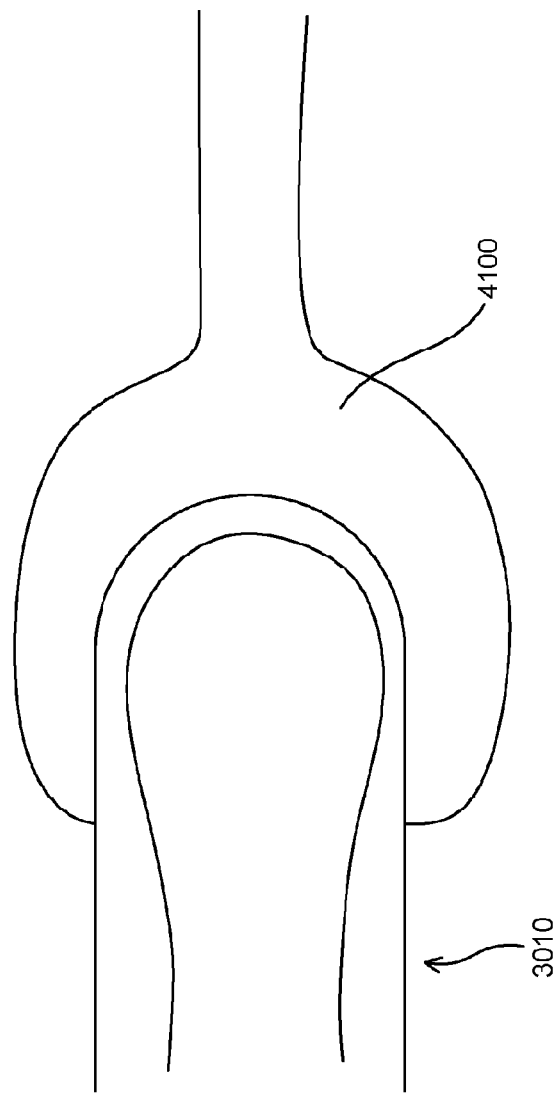

FIG. 42 is a bottom view of a lower flange having a U-shaped end.

Features and advantages of the embodiments will become more apparent from the detailed description set forth below when taken in conjunction with the drawings, in which like reference characters identify corresponding elements throughout.

DETAILED DESCRIPTION

Embodiments of the present disclosure will now be described in detail with reference to the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Regardless of whether a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Glass sheets are commonly fabricated by flowing molten glass to a forming body whereby a glass ribbon may be formed by a variety of ribbon forming processes including, float, slot draw, down-draw, fusion down-draw, updraw, or any other ribbon forming processes. The glass ribbon from any of these processes may then be subsequently divided to provide one or more glass sheets suitable for further processing according to a desired application, including but not limited to, a display application. For example, the one or more glass sheets can be used in a variety of display applications, including liquid crystal displays (LCDs), electrophoretic displays (EPD), organic light emitting diode displays (OLEDs), plasma display panels (PDPs), or the like. Glass sheets may be transported from one location to another location. The glass sheets may be transported with a conventional support frame designed to secure a stack of glass sheets in place. Moreover, interleaf material can be placed between each adjacent glass sheet to help prevent contact between, and therefore preserve, the pristine surfaces of the glass sheets.

It is to be understood that specific embodiments disclosed herein are intended to be exemplary and therefore non-limiting. As such, the present disclosure relates to methods and apparatus for processing at least one of a glass ribbon and a glass sheet. In some embodiments, the glass ribbon to be processed can be formed from a glass manufacturing apparatus, can be provided as it is being formed from a glass manufacturing apparatus, can be provided from a spool of previously-formed glass ribbon that can be uncoiled from the spool, or can be provided as a freestanding glass ribbon. In some embodiments, the glass sheet to be processed can be formed by a glass manufacturing apparatus, can be provided as a glass sheet separated from a glass ribbon, can be provided as a glass sheet separated from another glass sheet, can be provided as a glass sheet uncoiled from a spool of glass sheets, can be provided as a glass sheet obtained from a stack of glass sheets, or can be provided as a freestanding glass sheet.

Figure 1:
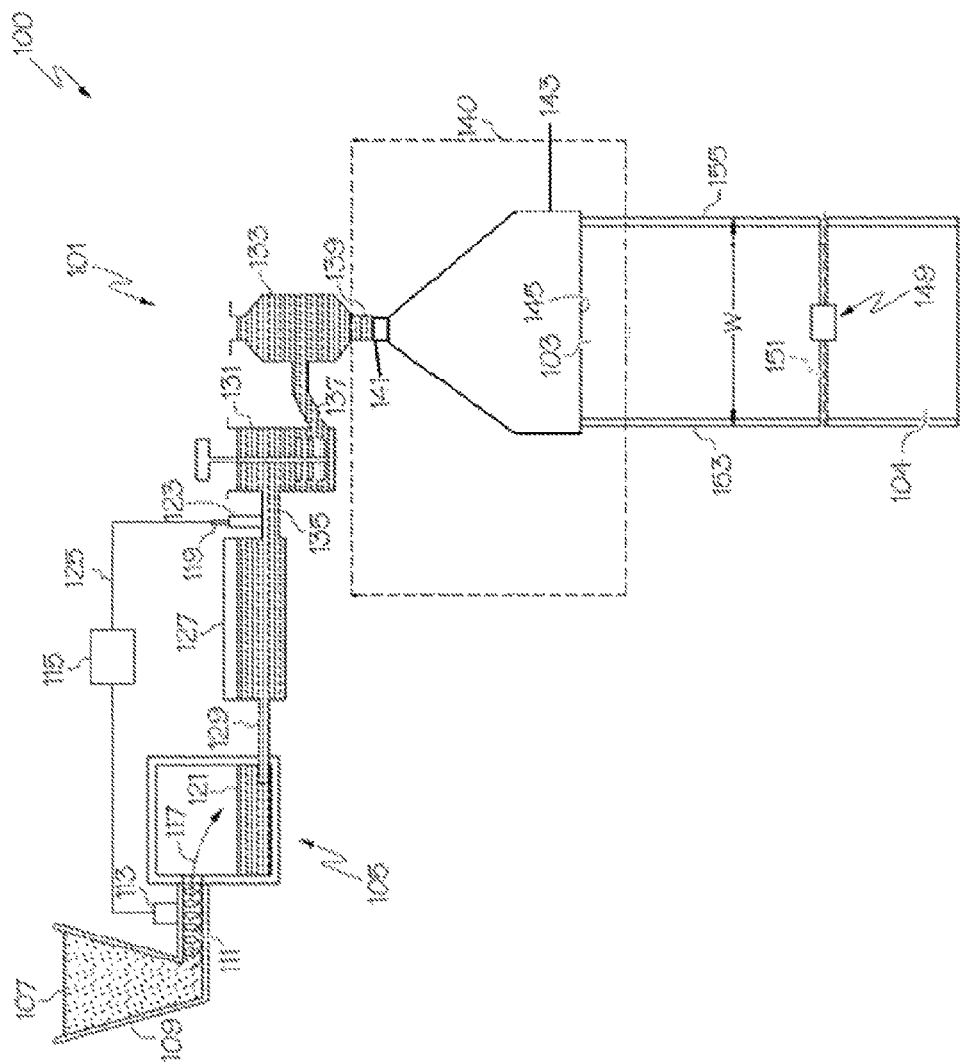
FIG. 1 is a schematic view of a glass processing apparatus including a down-draw apparatus to draw a glass ribbon.

In one embodiment, the glass processing apparatus 100 provides the glass ribbon 103 with a glass manufacturing apparatus 101 such as a slot draw apparatus, float bath apparatus, down-draw apparatus, up-draw apparatus, press rolling apparatus, or other glass ribbon manufacturing apparatus (as described in further detail below). FIG. 1 schematically illustrates the glass manufacturing apparatus 101 being a down-draw apparatus 101 for drawing the glass ribbon 103 for subsequent processing into glass sheets 104 through the use of a glass former 140. Any of elements 109-139 can be combined or omitted in any number of ways to supply molten glass to delivery pipe 139. Of course and as explained below, the glass manufacturing apparatus 101 can be a slot draw apparatus or other glass ribbon manufacturing apparatus and include differing glass formers depending upon the method of manufacture (see, e.g., FIGS. 2-14 and 19-29).

The down-draw apparatus 101 can include a melting vessel 105 oriented to receive batch material 107 from a storage bin 109. The batch material 107 can be introduced by a batch delivery device 111 powered by a motor 113. An optional controller 115 can be configured to activate the motor 113 such that batch delivery device 111 introduces a desired amount of batch material 107 into the melting vessel 105, as indicated by arrow 117. A glass melt probe 119 can be used to measure a level of molten material 121 within a standpipe 123 and communicate the measured information to the controller 115 by way of a communication line 125.

The down-draw apparatus 101 can also include a fining vessel 127 located downstream from the melting vessel 105 and coupled to the melting vessel 105 by way of a first connecting conduit 129. In some embodiments, molten material 121 may be gravity fed from the melting vessel 105 to the fining vessel 127 by way of the first connecting conduit 129. For instance, gravity may drive the molten material 121 through an interior pathway of the first connecting conduit 129 from the melting vessel 105 to the fining vessel 127. Within the fining vessel 127, bubbles may be removed from the molten material 121 by various techniques.

The down-draw apparatus 101 can further include a mixing chamber 131 that may be located downstream from the fining vessel 127. The mixing chamber 131 can be used to provide a homogenous composition of molten material 121, thereby reducing or eliminating inhomogeneity that may otherwise exist within the molten material 121 exiting the fining vessel 127. As shown, the fining vessel 127 may be coupled to the mixing chamber 131 by way of a second connecting conduit 135. In some embodiments, molten material 121 may be gravity fed from the fining vessel 127 to the mixing chamber 131 by way of the second connecting conduit 135. For instance, gravity may drive the molten material 121 through an interior pathway of the second connecting conduit 135 from the fining vessel 127 to the mixing chamber 131.

The down-draw apparatus 101 can further include a delivery vessel 133 that may be located downstream from the mixing chamber 131. The delivery vessel 133 may condition the molten material 121 to be fed into a glass former 140. For instance, the delivery vessel 133 can act as an accumulator and/or flow controller to adjust and provide a consistent flow of molten material 121 to the glass former 140. As shown, the mixing chamber 131 may be coupled to the delivery vessel 133 by way of a third connecting conduit 137. In some embodiments, molten material 121 may be gravity fed from the mixing chamber 131 to the delivery vessel 133 by way of the third connecting conduit 137. For instance, gravity may drive the molten material 121 through an interior pathway of the third connecting conduit 137 from the mixing chamber 131 to the delivery vessel 133.

As further illustrated, a delivery pipe 139 can be positioned to deliver molten material 121 to the glass former 140 of the down-draw apparatus 101. As discussed more fully below, the glass former 140 may draw the molten material 121 into the glass ribbon 103 from an orifice 145 of a forming vessel 143. In the illustrated embodiment, the forming vessel 143 can be provided with an inlet 141 oriented to receive molten material 121 from the delivery pipe 139 of the delivery vessel 133.

FIG. 1 illustrates a general schematic of an exemplary glass separator 149. As illustrated, an exemplary glass separator 149 may separate the glass sheet 104 from the glass ribbon 103 along a transverse separation path 151 that extends along the width "W" of the glass ribbon 103, transverse to the draw direction 177 of the glass former 140, between a first vertical edge 153 of the glass ribbon 103 and a second vertical edge 155 of the glass ribbon 103.

Glass former 140 can be scalable to deliver glass ribbon 103 of a desired size. In some embodiments, glass ribbon 103 can have a width "W" from about 50 mm to about 1.5 m. In further embodiments, glass ribbon 103 can have a width W from about 50 mm to about 500 mm. Glass ribbon 103 can have a width W from about 150 mm to about 300 mm. In some embodiments, the width "W" of the glass ribbon 103 can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

Figure 2:
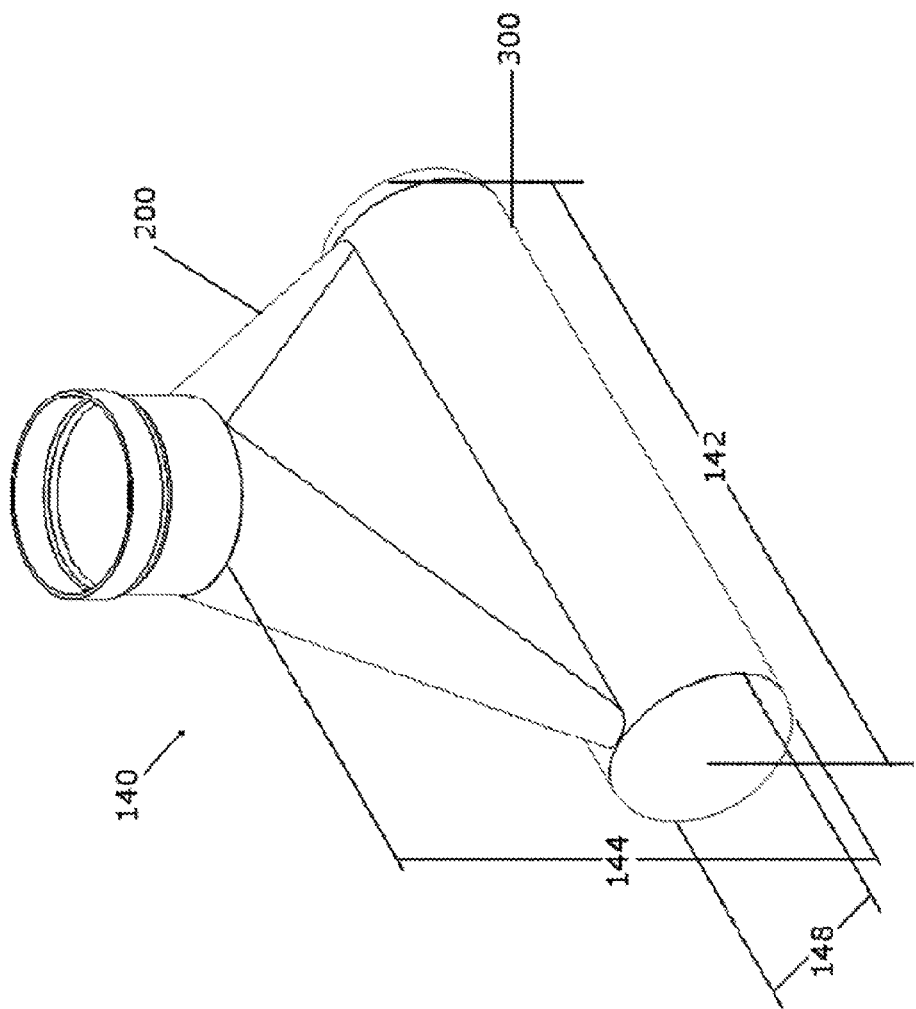
FIG. 2 is a perspective view of an exemplary glass forming apparatus according to the present disclosure.
Figure 3:
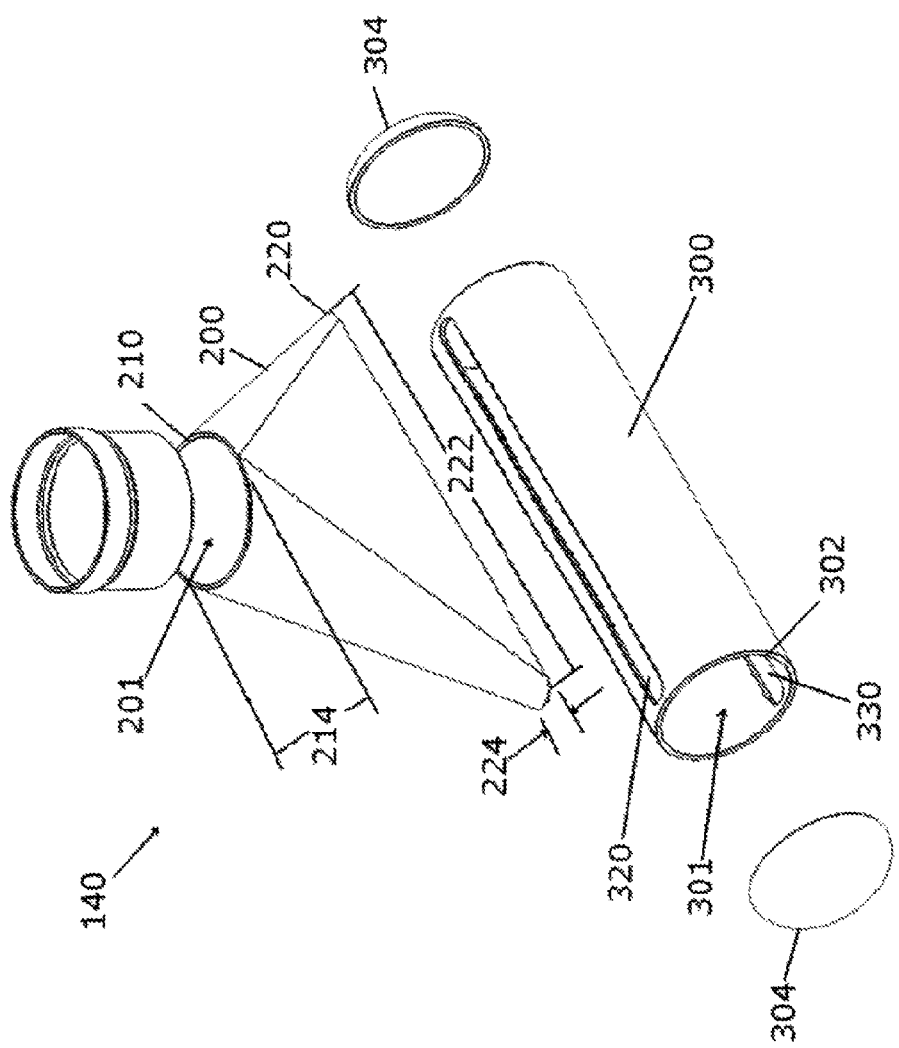
FIG. 3 is an exploded perspective view of the glass forming apparatus of FIG. 1.

Another embodiment of glass former 140 is shown in FIGS. 2-5. A further, non-limiting embodiment of another glass former 1140 is shown in FIGS. 19-29 and will be discussed in greater detail below. With reference to FIGS. 2-5, an exemplary glass former 140 can interface with the delivery pipe 139 and can deliver a glass ribbon to one or more downstream forming rolls 60 (see FIG. 14). As shown in FIG. 2, glass former 140 can have a width 142 extending along axis 10, a height 144 extending along axis 20, and a dimension 148 extending in the opening direction along axis 30 (FIG. 2). "Width" and "thickness" are also used herein to describe distance in the direction of axes 10 and 30, respectively, usually with respect to dimensions of the glass ribbon 103. Glass former 140 can include an upper transition member 200 and a pressure tank 300 to draw glass ribbon 103. Glass former 140 can provide glass ribbon 103 in a relatively short transition—height 144—from the molten glass supply because pressure tank 300 allows the molten glass to collect within pressure tank chamber 301 and directs the molten glass across lower orifice 330 (FIG. 3).

Figure 6:
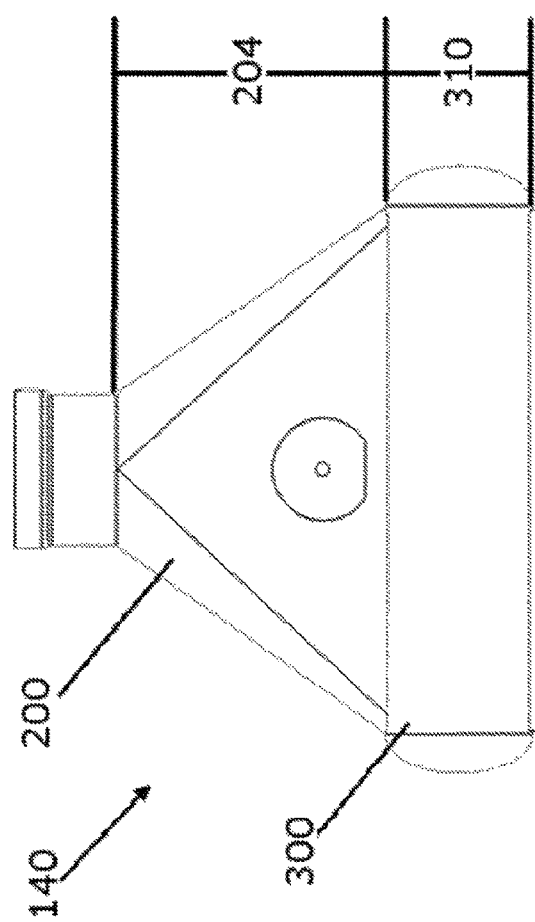
FIG. 6 is a side view of the glass forming apparatus of FIG. 1.

As shown in FIGS. 2-3, upper transition member 200 can be fixed to a molten glass supply at upper end 210 of upper transition member 200. For example, upper end 210 can be metallurgically bonded to the molten glass supply, e.g., delivery pipe 139, by welding or brazing. The molten glass can flow through transition chamber 201 of upper transition member 200. Upper transition member 200 can distribute molten glass from the center of upper end 210 across lower end width 222 at lower end 220. Upper transition member 200 can have a height 204 as shown in FIG. 6. Upper transition member 200 can be tapered along height 204 such that lower end width 222 is greater than upper end width 212. As shown in FIG. 3, upper end opening distance 214 can be greater than lower end opening distance 224. In some embodiments, upper transition member 200 can have a trapezoidal shape when viewed from the front, back, or side.

As used herein, the term "orifice" refers to an opening in a portion of glass former 140 that is configured to transmit fluid flow. An orifice can include one aperture (e.g., FIG. 3) or a plurality of apertures separated by supports (e.g., FIG. 8).

Pressure tank 300 can be attached to lower end 220 of upper transition member 200. For example, pressure tank 300 can be fixed to upper transition member 200 by a metallurgic bond by welding or brazing. Pressure tank 300 can include an upper orifice 320 and a lower orifice 330 formed therein such that pressure tank width 306 (see FIG. 3) can be greater than upper orifice width 322 and lower orifice width 332 (see FIG. 4). The molten glass can enter pressure tank 300 from upper transition member 200 through upper orifice 320. The molten glass can flow through pressure tank chamber 301. Molten glass entering pressure tank 300 at upper orifice 320 can have a flow where the velocity of the flow is greatest at a center of the flow. Pressure tank 300 can redistribute the molten glass flow from a center of pressure tank 300 to the ends 304 of pressure tank 300 at lower orifice 330 because pressure tank 300 collects the molten glass within pressure tank chamber 301 and allows the molten glass to spread across pressure tank width 306 (FIG. 5) due in part to the flow restriction at lower orifice 330. Pressure tank ends 304 seal pressure tank 300. Pressure tank ends 304 can be outwardly curved to reduce material stress and creep.

Figure 18:
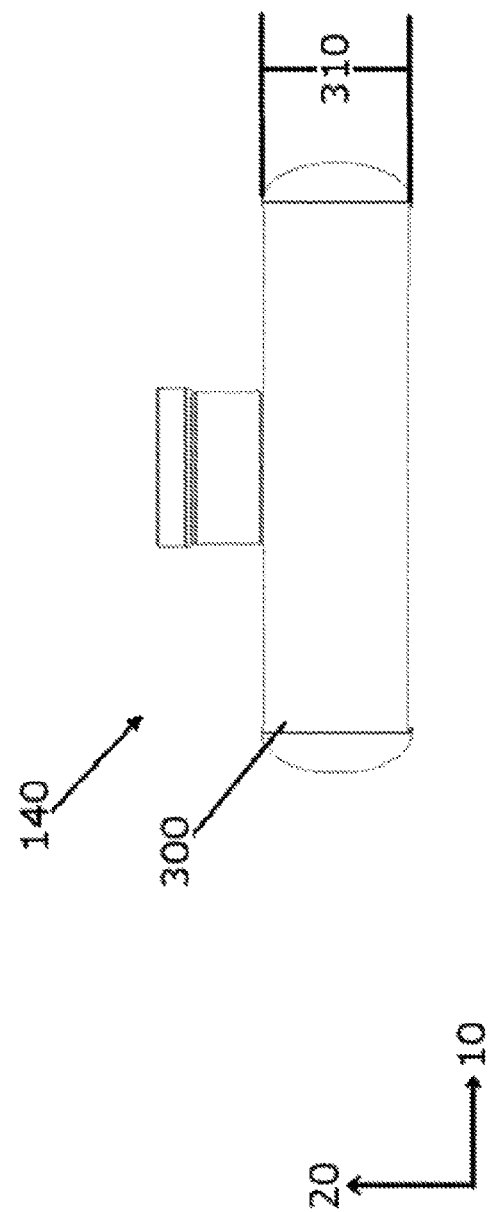
FIG. 18 is a side view of another glass forming apparatus according to the present disclosure.

In some embodiments, upper transition member 200 can be omitted from glass sheet former 140 and pressure tank 300 can be attached directly to a molten glass supply, as shown in FIG. 18.

As shown in the figures, pressure tank 300 can have a width 306, an opening dimension 308, and a height 310. These dimensions refer to the size of the interior of pressure tank 300 and do not include the distance occupied by the walls of pressure tank 300. Opening dimension 308 can be the largest dimension of pressure tank 300 in the opening direction along axis 30. Pressure tank 300 can be any shape that collects the molten glass flow within its interior volume to distribute the flow across lower orifice width 332 of lower orifice 330. For example, the shape of pressure tank 300 can be a rectangular prism, a cube, a triangular prism, a cone, a sphere, pyramid, or other shapes. In some embodiments, pressure tank 300 can be a cylinder where the opening dimension 308 and height 310 are equal. The width of pressure tank 300 can extend along axis 10 that lies in the plane of glass ribbon 103 such that the width of pressure tank 300 is positioned perpendicularly to the direction of glass flow. In another embodiment, pressure tank 300 can have a tapered shape such that a surface area of a lower end of the tank 300 is greater than a surface area of an upper end of the tank 300. Cylindrical shapes are preferred as they are more resistant to deformation due to internal pressure.

Figure 4:
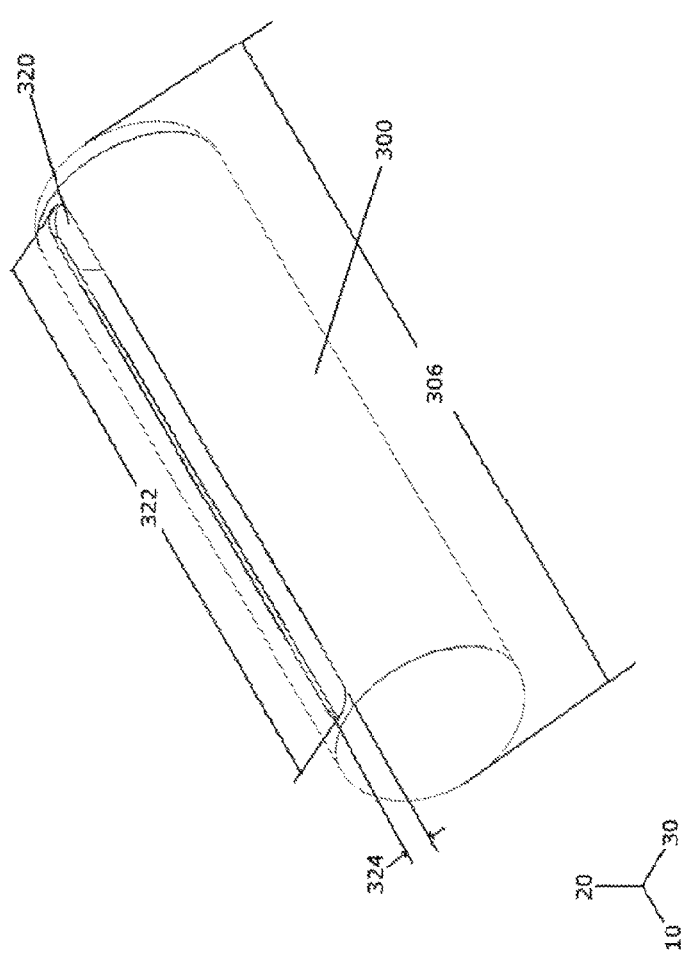
FIG. 4 is a perspective view of a pressure tank according to the present disclosure.
Figure 5:
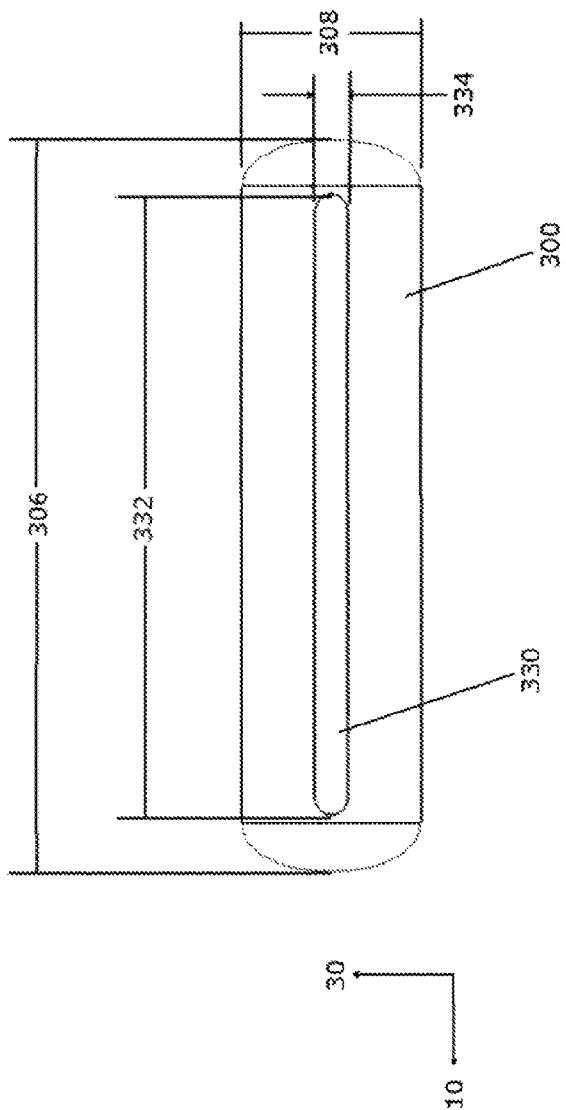
FIG. 5 is a bottom view of the pressure tank of FIG. 4.

As shown in FIG. 4, upper orifice 320 can have an upper orifice width 322 and an upper orifice opening distance 324. Referring to FIG. 5, lower orifice 330 can have a lower orifice width 332 and a lower orifice opening distance 334. In some embodiments, upper orifice 320 and lower orifice 330 can be approximately the same size. In some embodiments, lower orifice width 332 can be greater than upper orifice width 322. In some embodiments, lower orifice width 332 can be from approximately 50 mm to approximately 1.5 m. In a further embodiment, lower orifice width 332 can be from approximately 50 mm to approximately 500 mm. In another embodiment, lower orifice width 332 can be from approximately 150 mm to approximately 300 mm. In some embodiments, the flow density of molten glass through lower orifice 330 can be from about one kilogram per centimeter per hour to approximately 36 kilograms per centimeter per hour.

Because the opening dimension 308 is greater than the opening distance 334 of the lower orifice 330 (FIG. 5), molten glass is subject to pressure in pressure tank 300 that distributes the molten glass along width 306 of pressure tank 300.

In some embodiments, pressure tank opening dimension 308 can be greater than upper orifice opening distance 324. In another embodiment, pressure tank opening dimension 308 can be greater than lower orifice opening distance 334. In a further embodiment, pressure tank opening dimension 308 can be greater than upper orifice opening distance 324 and lower orifice opening distance 334.

In some embodiments, pressure tank opening dimension 308 can be approximately two to approximately ten times greater than upper orifice opening distance 324. Pressure tank opening dimension 308 can be approximately four to approximately six times greater than upper orifice opening distance 324. In some embodiments, pressure tank opening dimension 308 can be approximately two to approximately ten times greater than lower orifice opening distance 334. Pressure tank opening dimension 308 can be approximately four to approximately six times greater than lower orifice opening distance 334.

In some embodiments, pressure tank opening dimension 308 can be greater than lower end opening distance 224 of upper transition member 200. In another embodiment, pressure tank opening dimension 308 can be approximately two to approximately ten times greater than lower end opening distance 224 of upper transition member 200. In a further embodiment, pressure tank opening dimension 308 can be approximately four to approximately six times greater than lower end opening distance 224 of upper transition member 200.

In some embodiments, glass former 140 can be a material that is resistant to material deformation, i.e., creep, at high temperatures and pressures. Glass former 140 can be a material to deliver a molten glass at a temperature of approximately 1400 degrees Celsius to approximately 1700 degrees Celsius. In some embodiments, glass former 140 (and components thereof, e.g., supporting members 331, etc.) can be a platinum and rhodium alloy to allow glass former 140 to be compatible with high temperature and pressure for delivering high temperature molten glass. In some embodiments, glass former 140 can be a doped PtRh alloy. In some embodiments, glass former 140 can be an 80% Pt 20% Rh alloy. In another embodiment, glass former 140 can be a 90% Pt 10% Rh alloy. In further embodiments, glass former 140 can be comprised of oxide dispersion hardened platinum (DPH). In a further embodiment, glass former 140 can be a zircon doped material or another PtRh alloy.

In some embodiments, the viscosity of molten glass flowing through glass former 140 can be controlled by adjusting one or more of the following: flow distance and pressure of the molten glass supply; temperature of the molten glass supply; width of lower orifice 330; and opening distance 334 of lower orifice 330. The viscosity of the molten glass flowing through glass former 140 can be from approximately 50 poises to approximately 35,000 poises. In further embodiments, the viscosity of the molten glass flowing through glass former 140 can be from approximately 1,000 poises to approximately 5,000 poises. Viscosity of the molten glass at a position in glass former 140 can be determined based on the temperature of glass former 140 at that position. In some embodiments, glass former 140 can include temperature sensors (not shown) to determine the temperature at one or more positions in glass former 140 in order to determine the viscosity of the molten glass at those positions.

Referring now to FIGS. 7-10, glass former 140 can include internal structural reinforcements to maintain its shape over time and avoid material creep at high temperature and glass pressure without external reinforcements. Due to the internal structural reinforcements, glass former 140 does not require external mechanical reinforcement to maintain its shape over time and avoid material creep at high temperature and glass pressure. For example, upper transition member 200 can include upper transition member support 230. Upper transition member support 230 can extend along axis 30 and can extend across transition chamber 201. In some embodiments, upper transition member support 230 can attach to upper transition member 200 using support plates 232 positioned at the ends of upper transition member support 230. Support plates 232 can reduce stress concentrations in portions of the wall of upper transition member 200 adjacent upper transition member support 230. In some embodiments, upper transition member support 230 and support plates 232 can be metallurgically bonded to upper transition member 200, for example by brazing or welding.

Figure 8:
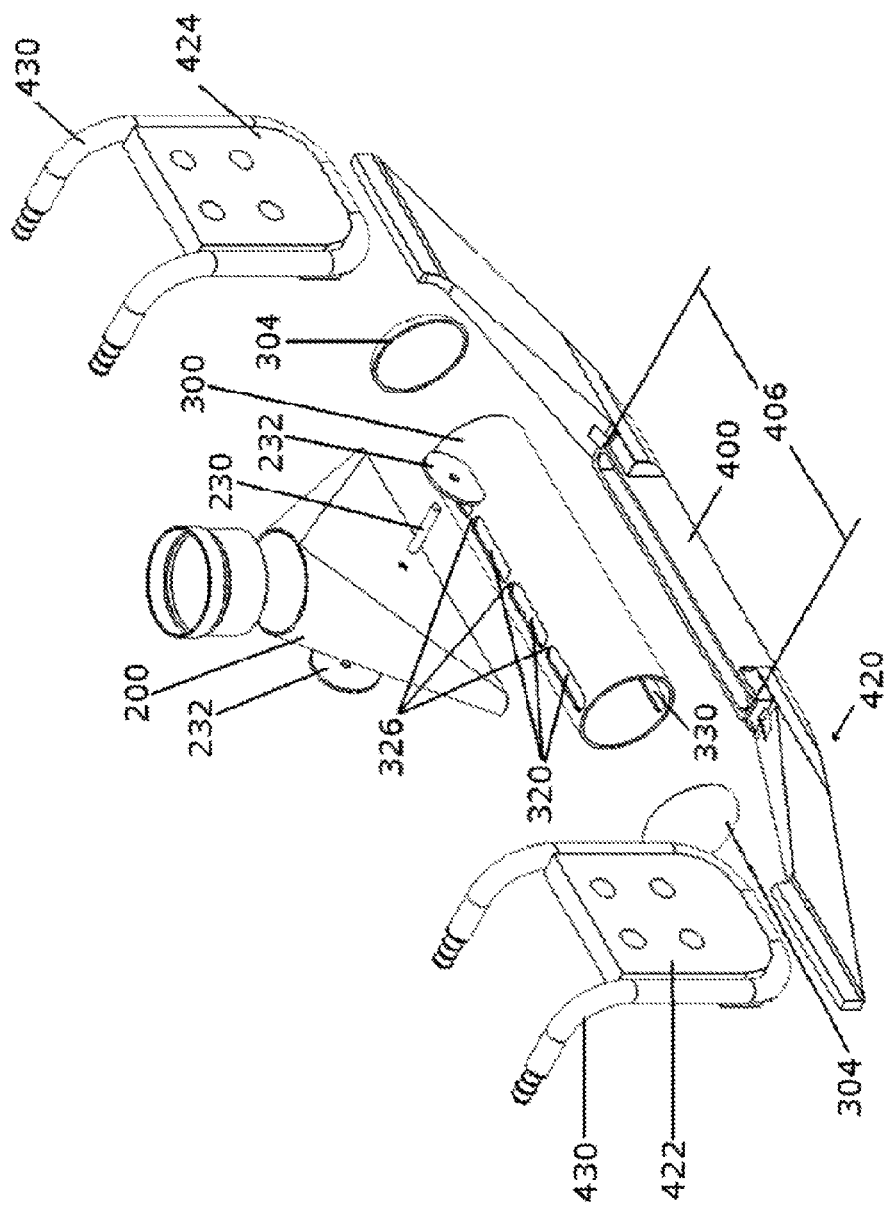
FIG. 8 is an exploded perspective view of the glass forming apparatus of FIG. 5.
Figure 9:
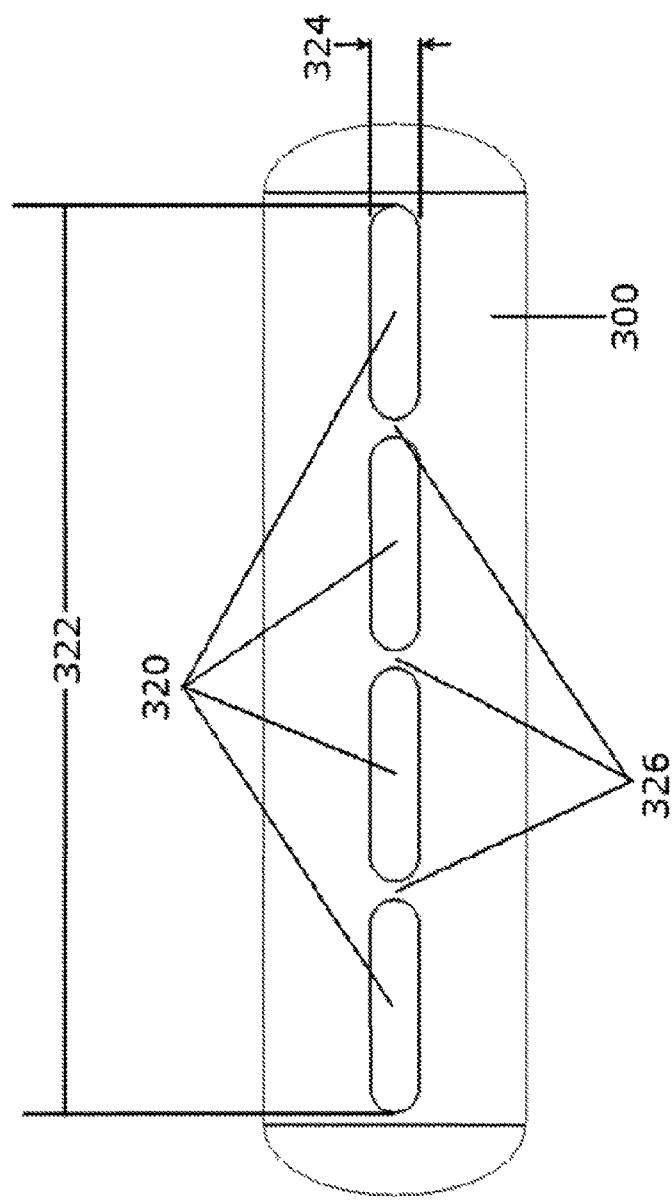
FIG. 9 is a top view of a pressure tank according to the present disclosure.

As shown in FIGS. 8-9, pressure tank 300 can include one or more upper pressure tank supports 326. Upper pressure tank supports 326 can extend along axis 30 and can extend across upper orifice 320 to prevent widening of upper orifice 320. In some embodiments, pressure tank 300 can include two upper pressure tank supports 326 that extend across orifice 320. In some embodiments, pressure tank 300 can include three upper pressure tank supports 326 that extend across upper orifice 320.

Upper pressure tank supports 326 can be permanently fixed across upper orifice 320, for example, by metallurgic bonding by welding or brazing. In some embodiments, upper orifice 320 can include a plurality of apertures formed in pressure tank wall 302. In this embodiment, portions of pressure tank wall 302 can be removed to form the plurality of apertures for upper orifice 320. Upper pressure tank supports 326 can be integrally formed in pressure tank wall 302. For example, in manufacturing pressure tank 300, pressure tank wall 302 can begin as a unitary piece of material and portions of pressure tank wall 302 can be removed to form the plurality of apertures for upper orifice 320. One or more portions of pressure tank wall 302 that remain between the respective apertures for upper orifice 320 form one or more integral upper pressure tank supports 326.

Figure 10:
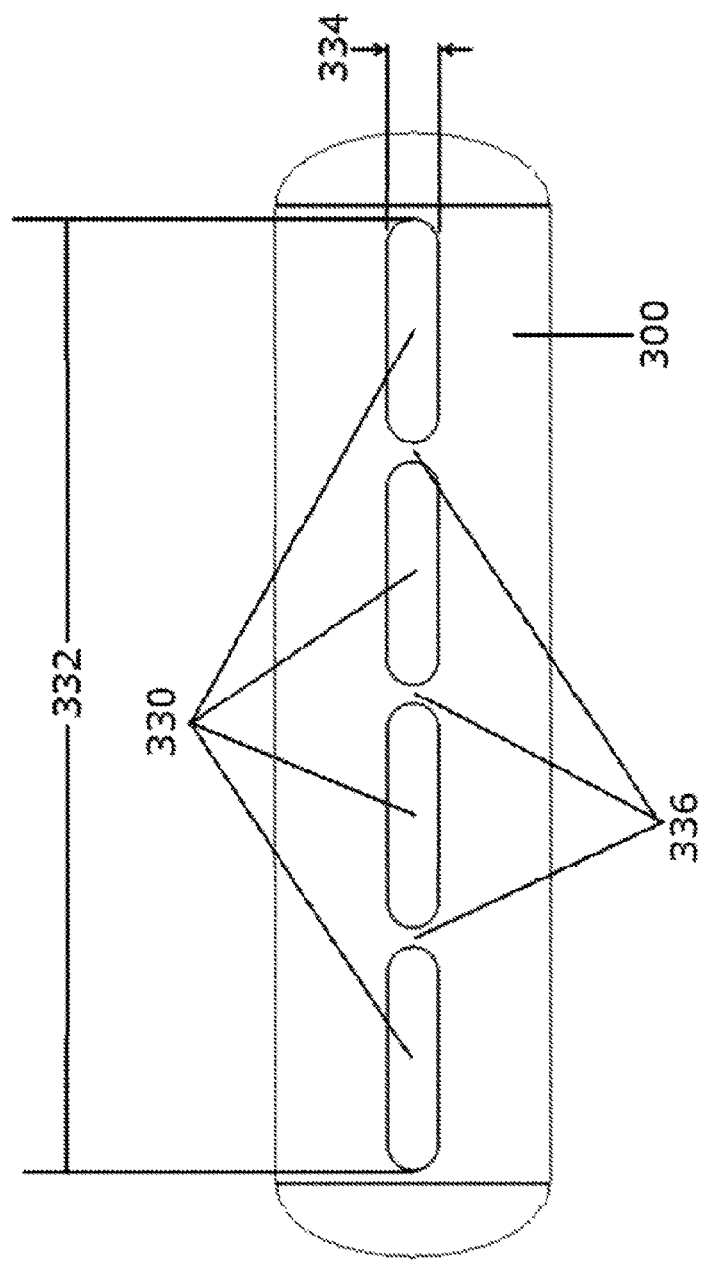
FIG. 10 is a bottom view of the pressure tank of FIG. 8.

As shown in FIG. 10, pressure tank 300 can include one or more lower pressure tank supports 336. Lower pressure tank supports 336 can extend along axis 30 and can extend across lower orifice 330 to prevent widening of lower orifice 330. In some embodiments, pressure tank 300 can include two lower pressure tank supports 336 that extend across orifice 330. In another embodiment, pressure tank 300 can include three lower pressure tank supports 336 that extend across lower orifice 330.

Lower pressure tank supports 336 can be permanently fixed across lower orifice 330, for example, by metallurgic bonding by welding or brazing. In some embodiments, lower orifice 330 can include a plurality of apertures formed in pressure tank wall 302. In this embodiment, portions of pressure tank wall 302 can be removed to form the plurality of apertures for lower orifice 330. Lower pressure tank supports 336 can be integrally formed in pressure tank wall 302. For example, in manufacturing pressure tank 300, pressure tank wall 302 can begin as a unitary piece of material and portions of pressure tank wall 302 can be removed to form the plurality of apertures for lower orifice 330. One or more portions of pressure tank wall 302 that remain between the respective apertures for lower orifice 330 form one or more integral lower pressure tank supports 336.

In some embodiments, pressure tank 300 could include one or more tank supports positioned along a height of pressure tank 300. In this embodiment, the one or more tank supports could extend across pressure tank chamber 301.

The internal reinforcements in glass former 140 prevent material deformation and creep. For example, because lower pressure tank supports 336 prevent material deformation and creep at lower orifice 330, the opening distance 334 of lower orifice 330 can be constant along lower orifice width 332.

Upper pressure tank supports 326 and lower pressure tank supports 336 can create separate streams of molten glass flowing through pressure tank 300 and lower orifice 330. For example, upper pressure tank supports 326 and lower pressure tank supports 336 can separate the molten glass flowing through pressure tank 300 and lower orifice 330 into two or more streams of molten glass.

Figure 7:
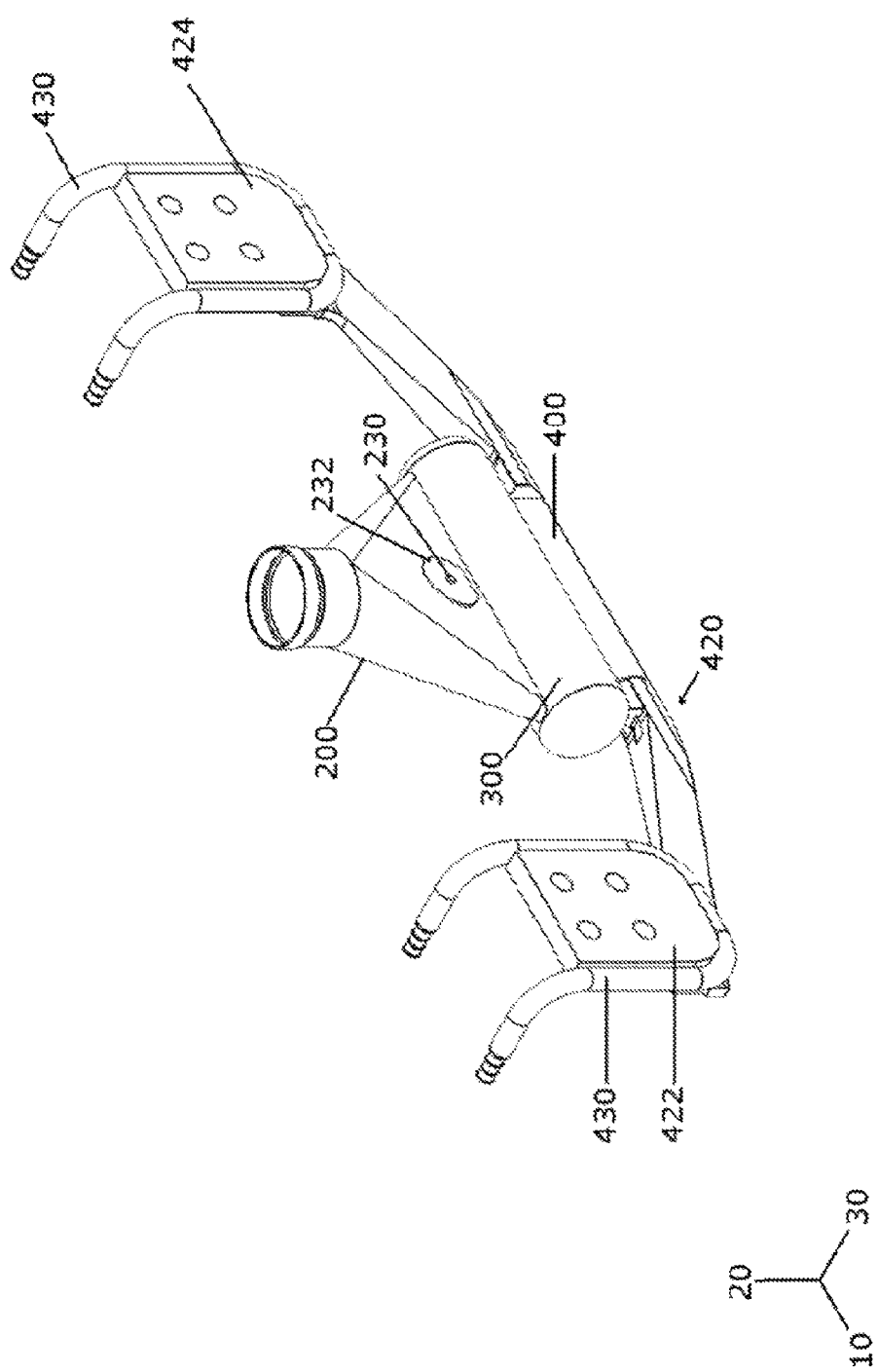
FIG. 7 is a perspective view of another glass forming apparatus according to the present disclosure.

In some embodiments, glass former 140 can include a slot extension 400 attached to pressure tank 300, as shown in FIGS. 7-8. An interior volume 401 of slot extension 400 can be in fluid communication with pressure tank chamber 301. The separate streams of molten glass resulting from upper pressure tank supports 326 and lower pressure tank supports 336 can converge in slot extension 400 and fuse into glass ribbon 103.

Figure 11:
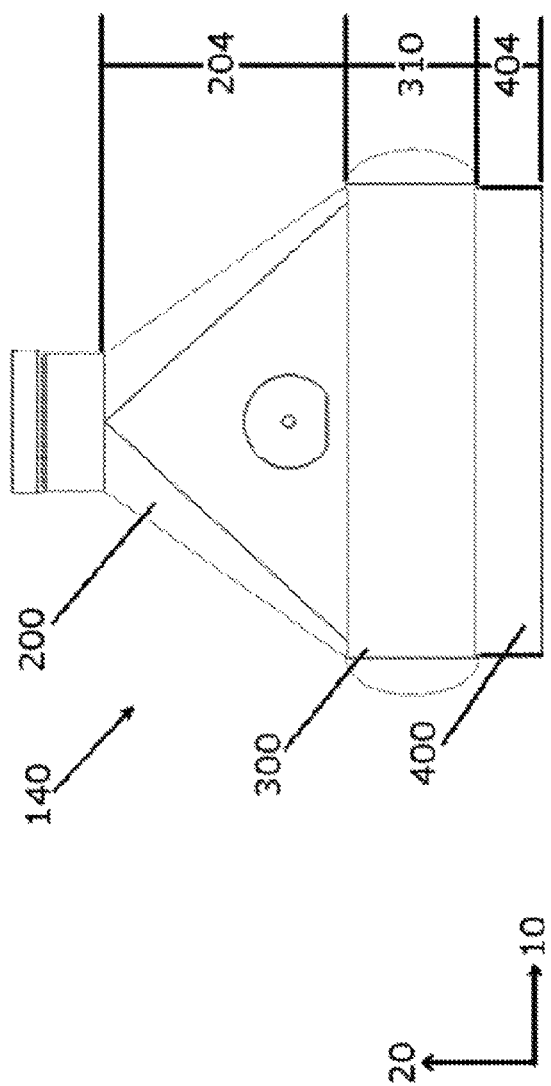
FIG. 11 is a front view of another glass forming apparatus according to the present disclosure.
Figure 12:
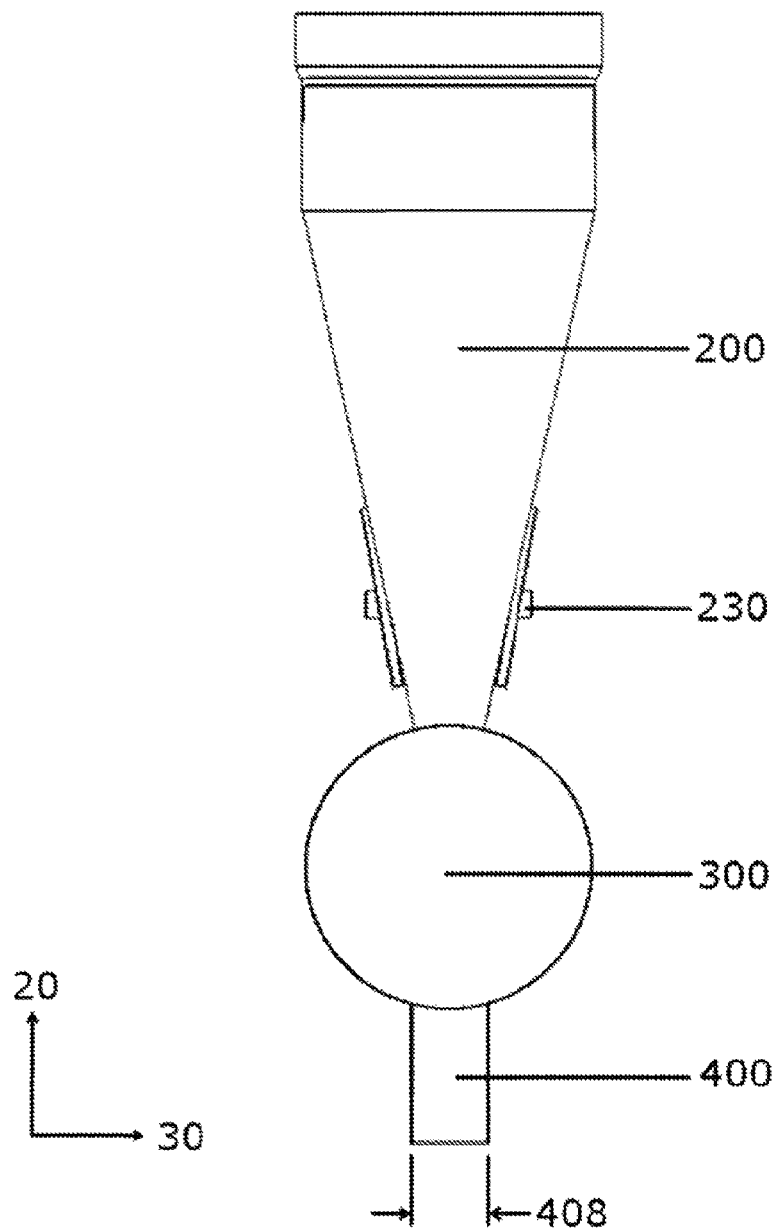
FIG. 12 is a side view of the glass forming apparatus of FIG. 11.
Figure 13:
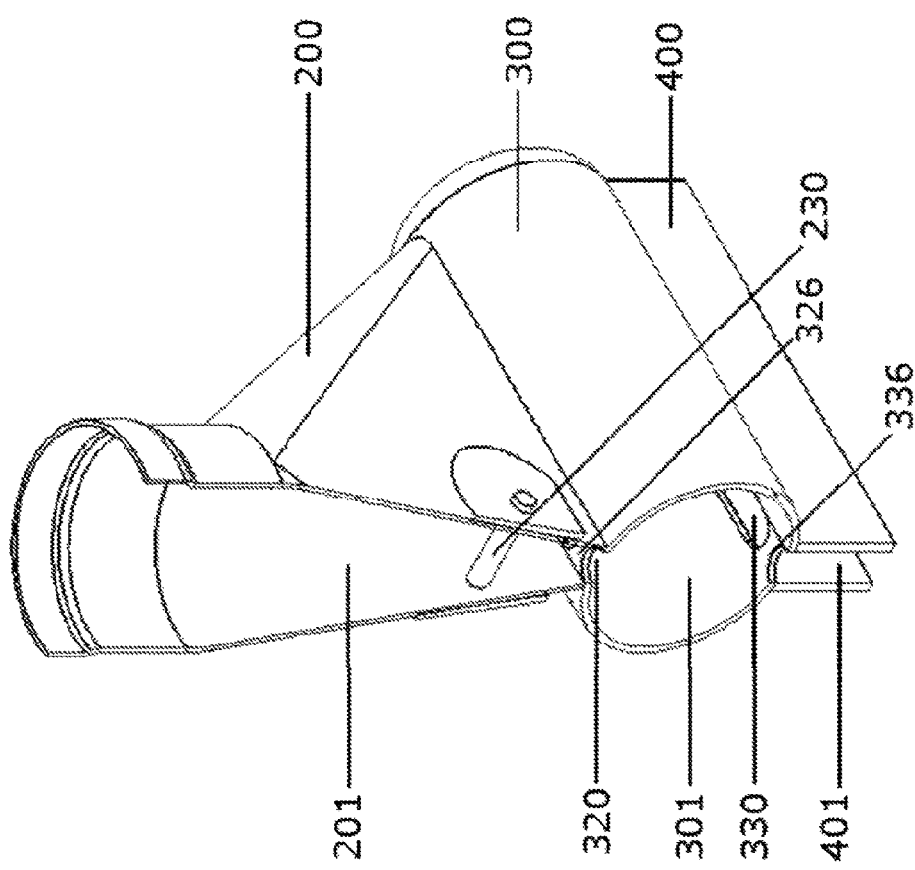
FIG. 13 is a section view of the glass forming apparatus shown in FIG. 11.

Slot extension 400 can include a slot extension height 404, a slot extension width 406, and a slot extension opening distance 408, as shown in FIGS. 11-12. In some embodiments, slot extension width 406 can be slightly larger than lower orifice width 332 so that slot extension 400 completely surrounds lower orifice 330. In some embodiments, slot extension width 406 can be from approximately 50 mm to approximately 1.5 m. In a further embodiment, slot extension width 406 can be from approximately 50 mm to approximately 500 mm. In another embodiment, slot extension width 406 can be from approximately 150 mm to approximately 300 mm.

In some embodiments, slot extension height 404 can be from about 10 mm to about 30 mm. In another embodiment, slot extension height 404 can be from about 15 mm to about 25 mm. In a further embodiment, slot extension height 404 can be from about 1 mm to about 100 mm. In another embodiment, slot extension height 404 can be about 20 mm.

Slot extension opening distance 408 can be slightly larger than lower orifice opening distance 334 so that slot extension 400 completely surrounds lower orifice 330. In some embodiments, pressure tank opening dimension 308 can be approximately two to approximately ten times greater than slot extension opening distance 408. Pressure tank opening dimension 308 can be approximately four to approximately six times greater than slot extension opening distance 408.

As shown in FIGS. 7-8, glass former 140 can also include a heat source 420 to prevent the molten glass flow from cooling. In some embodiments, heat source 420 can be slot extension 400. A first end 422 of heat source 420 can be configured to be attached to a first electric connection and a second end 424 of heat source 420 can be configured to be attached to a second electrical connection to supply an electric current through heat source 420 and slot extension 400 to generate heat via direct heating using a flange or other mechanism. For direct heating, the first electrical connection at first end 422 and the second electrical connection at second end 424 can provide direct electrical input into slot extension 400 whereby the material is kept at a substantially constant temperature depending upon the desired viscosity. In another embodiment, heat source 420 can provide heat via induction heating (not shown). In another embodiment, heat source 420 can include a winding or a ceramic heating element (not shown) attached to an exterior surface of slot extension 400 or other portions of the glass former. Glass former 140 can also include cooling tubes 430 positioned adjacent to heat source 420. Cooling fluid can be passed through cooling tubes 430 to maintain glass former 140 at a desired temperature. In some embodiments, glass former 140 can include temperature sensors (not shown) to determine the temperature at one or more positions in glass former 140. The temperature sensors can be utilized to determine an appropriate heat setting for heat source 420 and an appropriate cool setting for cooling tubes 430 to achieve a desired viscosity of molten glass flowing therein.

Figure 14:
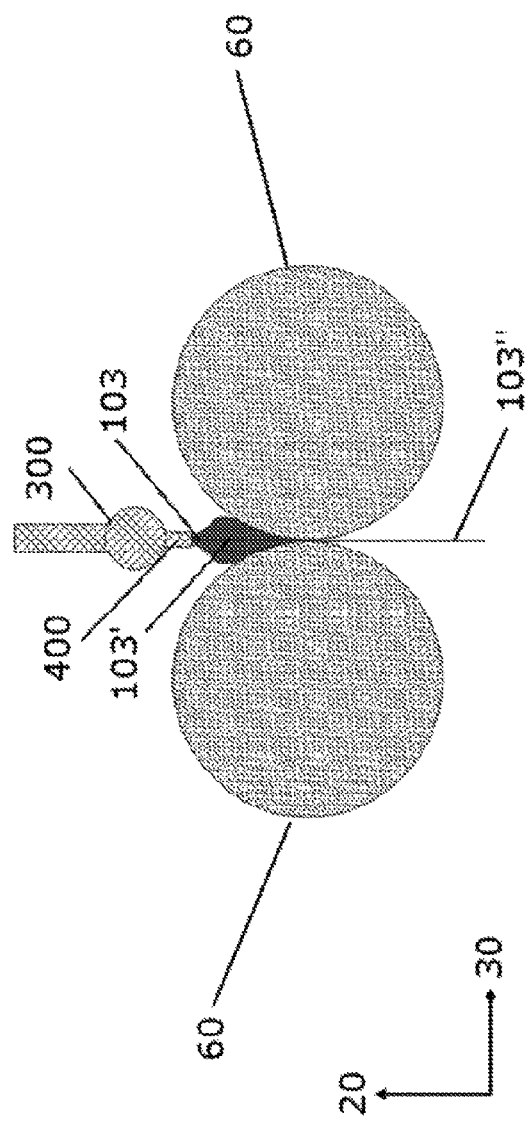
FIG. 14 is a side view of the glass forming apparatus of FIG. 11 including forming rolls.

In some embodiments, glass former 140 can deliver glass ribbon 103 for further processing. In other embodiments, glass former 140 can be utilized with a vertical rolling process and can supply glass ribbon 103 to a pair of forming rolls 60 for further processing of glass ribbon 103, as shown in FIG. 14. The pair of forming rolls 60 can be conventional hot forming rolls that are temperature controlled at a surface temperature in a range from about 500 degrees Celsius to about 600 degrees Celsius, or higher, depending on the composition and viscosity of the glass being formed. Processes and devices for the temperature control of forming rolls are well understood in the art and are therefore not described in detail herein.

Slot extension 400 can also deliver glass ribbon 103 as low as possible between the pair of forming rolls 60 to prevent instability in the flow of glass ribbon 103. For example, the diameter of rolls 60 can be large enough that rolls 60 extend beyond a plane formed by the bottom of slot extension 400 so a stable flow of glass ribbon 103 can be provided to rolls 60. As shown in FIG. 14, glass ribbon 103 can exit slot extension 400 and accumulate on a top portion of rolls 60 to form a glass ribbon puddle 103'. The pair of forming rolls 60 can flatten, thin, and smooth the glass ribbon puddle 103' into pressed glass ribbon 103". The thickness of glass ribbon 103 can be greater than the thickness of pressed glass ribbon 103". The thickness of glass ribbon puddle 103' can be greater than the thickness of glass ribbon 103.

Due to the high temperature conditions under which a glass former operates, the material of the glass former may be subject to creep, which deforms the glass former. Creep may be more pronounced where the glass former is also subject to stress. Creep results in deformation of the glass former, which can result in degraded performance. For example, a change in the shape of an orifice from which glass flows can alter the velocity of glass flow at different points across the width of the glass former. One way to reduce creep is to surround the glass former with a refractory material. But, the refractory material can add bulk to the glass former. This additional bulk may interfere with the ability to deliver a glass ribbon close to forming rolls. Embodiments of glass formers described herein are resistant to creep in the absence of a refractory material. For example, the use of a 80/20 PtRh alloy, a 90/10 PtRh alloy and similar materials, the presence of upper transition member support 230, upper pressure tank support 326, lower pressure tank support 336, and a cylindrical shape for pressure tank 300 each contribute to creep resistance. These features, alone or in combination, contribute to a design that is resistant to creep even without the use of refractory materials. A combination of all of these features is particularly preferred for creep resistance In a glass former, the velocity of molten glass flow tends to be higher in the middle of the width of the glass former because the middle is furthest from the walls of the glass former. Without a pressure tank, a uniform velocity (deviation of plus or minus about 5%) can be achieved by varying the shape of an orifice so the orifice opening distance is smallest at the middle of the width and largest at the respective ends of the width, i.e., a dog bone or bowtie shape. This irregular shape can be difficult to manufacture and can be subject to creep and expansion of the orifice opening distance over time.

A pressure tank may result in uniform velocity across the width of the lower orifice where the orifice opening distance is uniform across the width of the orifice. This simpler geometry is easier to manufacture.

Figure 15:
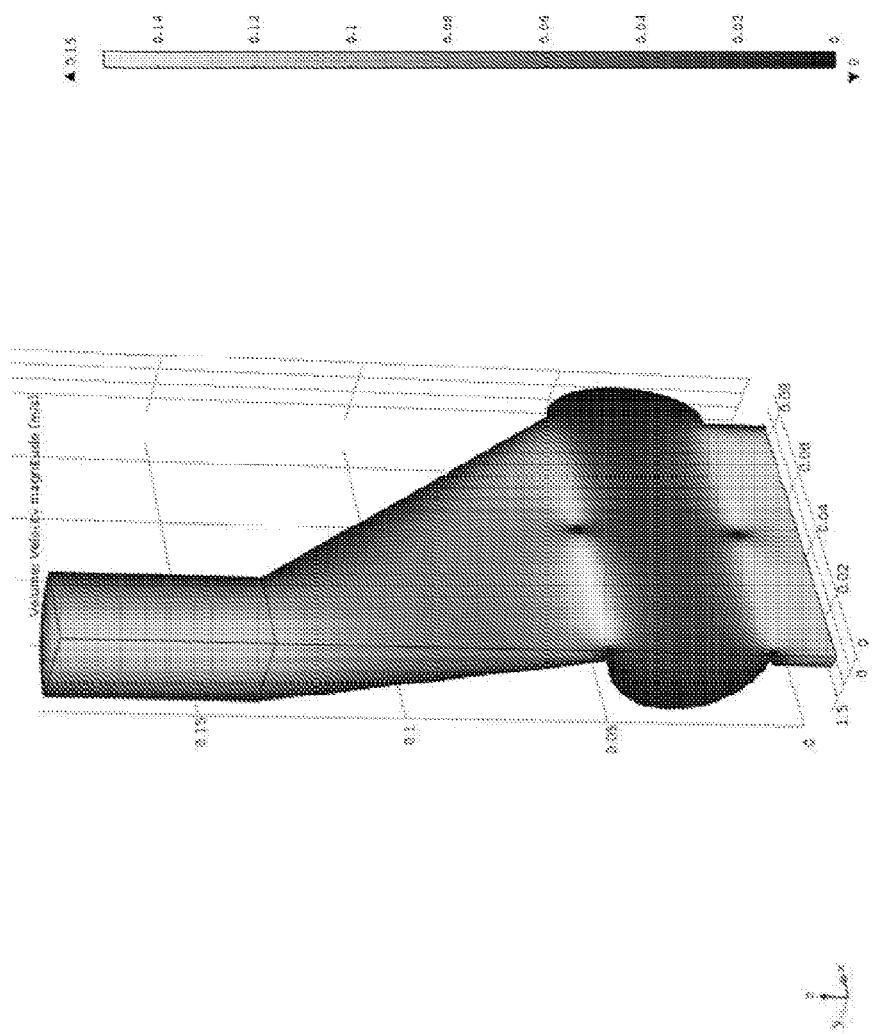
FIG. 15 is a perspective view of the glass forming apparatus of FIG. 11 showing a prediction of fluid flow through the glass forming apparatus.
Figure 16:
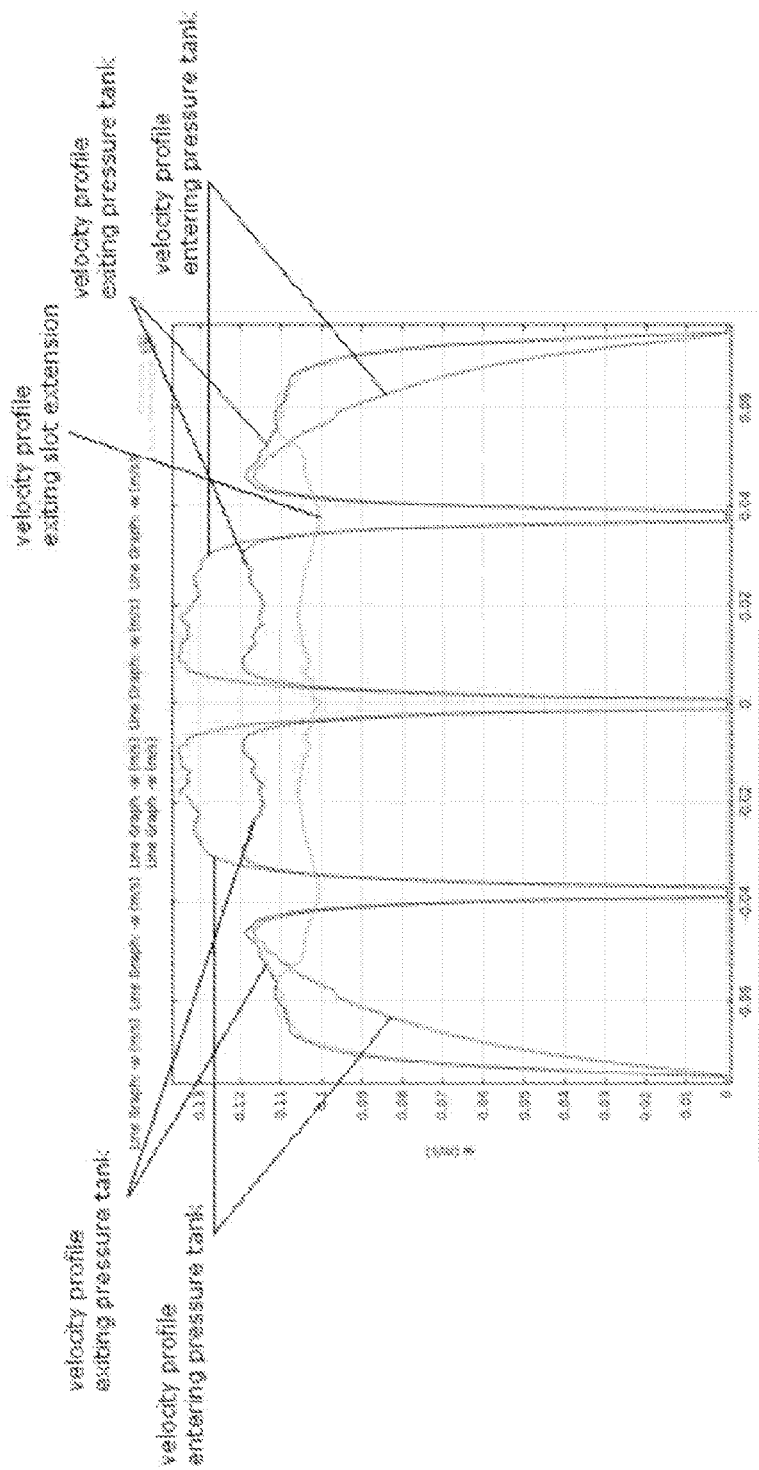
FIG. 16 is a graph showing the velocity profiles of molten glass through the glass forming apparatus of FIG. 11.

FIG. 15 shows a 3D fluid flow model velocity magnitude prediction of molten glass through glass former 140. Because the flow is symmetric in glass former 140 across a first mid-plane and a second mid-plane perpendicular to the first mid-plane, the domain of the computer model is one-quarter of glass former 140. As shown, the local velocity of the molten glass flow where molten glass touches the side walls of glass former 140 is about zero. Molten glass entering upper transition member 200 has a faster velocity at its center. The local velocity of the molten glass flow is also about zero in the region of upper pressure tank support 326 and lower pressure tank support 336. While the velocity of molten glass through upper orifice 320 and lower orifice 330 is relatively fast, the velocity of molten glass is slower in pressure tank 300 because the molten glass is distributed within pressure tank chamber 301 before flowing through lower orifice 330. Thus, any separate streams of molten glass caused by molten glass flow past upper pressure tank support 326 and/or lower pressure tank support 336 converge and fuse within slot extension 400 into glass ribbon 103. As shown in FIG. 15, glass former 140 can draw glass ribbon 103 having a uniform velocity at the end of slot extension 400. As shown in FIG. 16, the velocity profile of the molten glass flow across the width of the lower end of slot extension 400 has a deviation of plus or minus about 5%.

Figure 17:
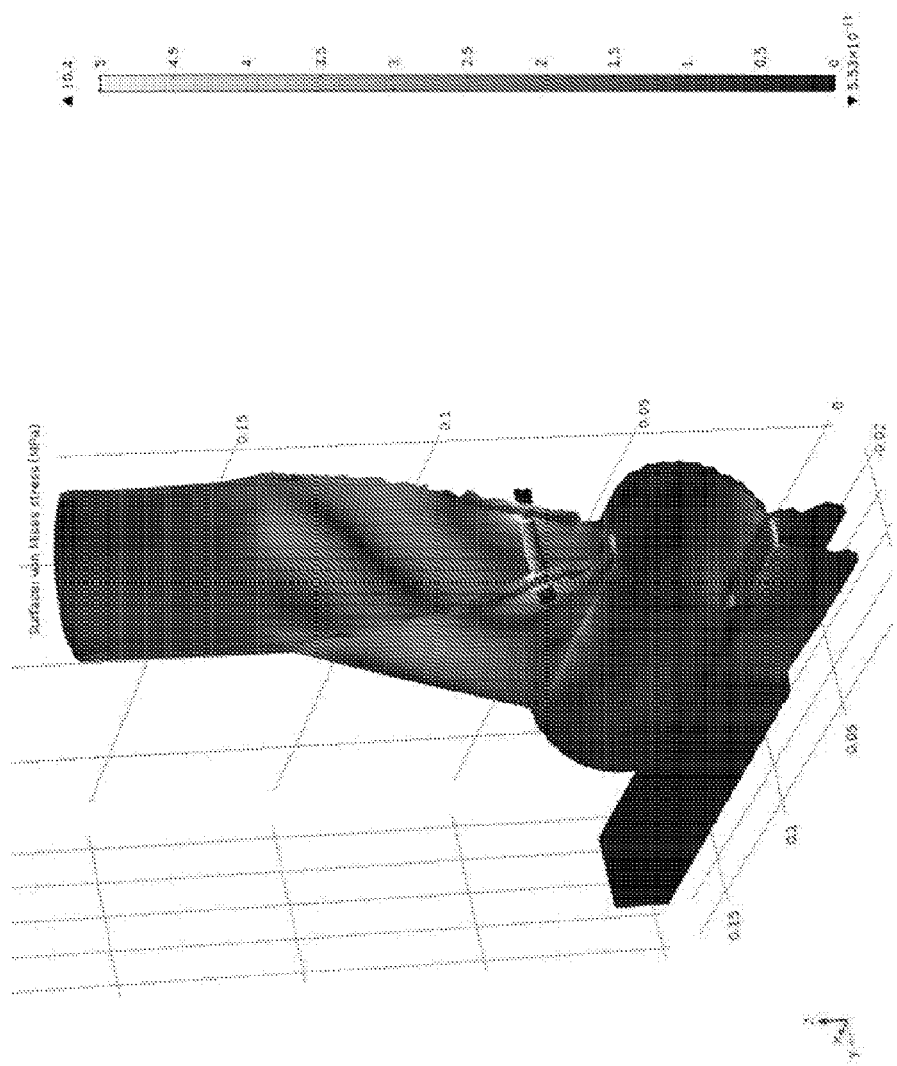
FIG. 17 is a section view of the glass forming apparatus of FIG. 11 showing a prediction of surface von Mises stress (MPa) in the glass forming apparatus.

FIG. 17 shows a sectional view of glass former 140 to demonstrate the surface von Mises stress (MPa), as predicted with a 3D COMSOL Multiphysics® model. As shown, despite the high tensile stress in each inner structural reinforcement, upper transition member support 230, upper pressure tank support 326, and lower pressure tank support 336 reduce material creep within glass former 140.

FIGS. 19-29 illustrate another exemplary glass former 1140 according to some embodiments. Like glass former 140, glass former 1140 can be scalable to deliver glass ribbon 103 of a desired size. In some embodiments, glass former 1140 can deliver glass ribbon 103 having a width "W" from about 50 mm to about 1.5 m. In further embodiments, glass former 1140 can deliver glass ribbon 103 having a width W from about 50 mm to about 500 mm. In some embodiments, glass former 1140 can deliver glass ribbon 103 having a width W from about 150 mm to about 300 mm. In some embodiments, glass former 1140 can deliver glass ribbon having a width W from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

Figure 20:
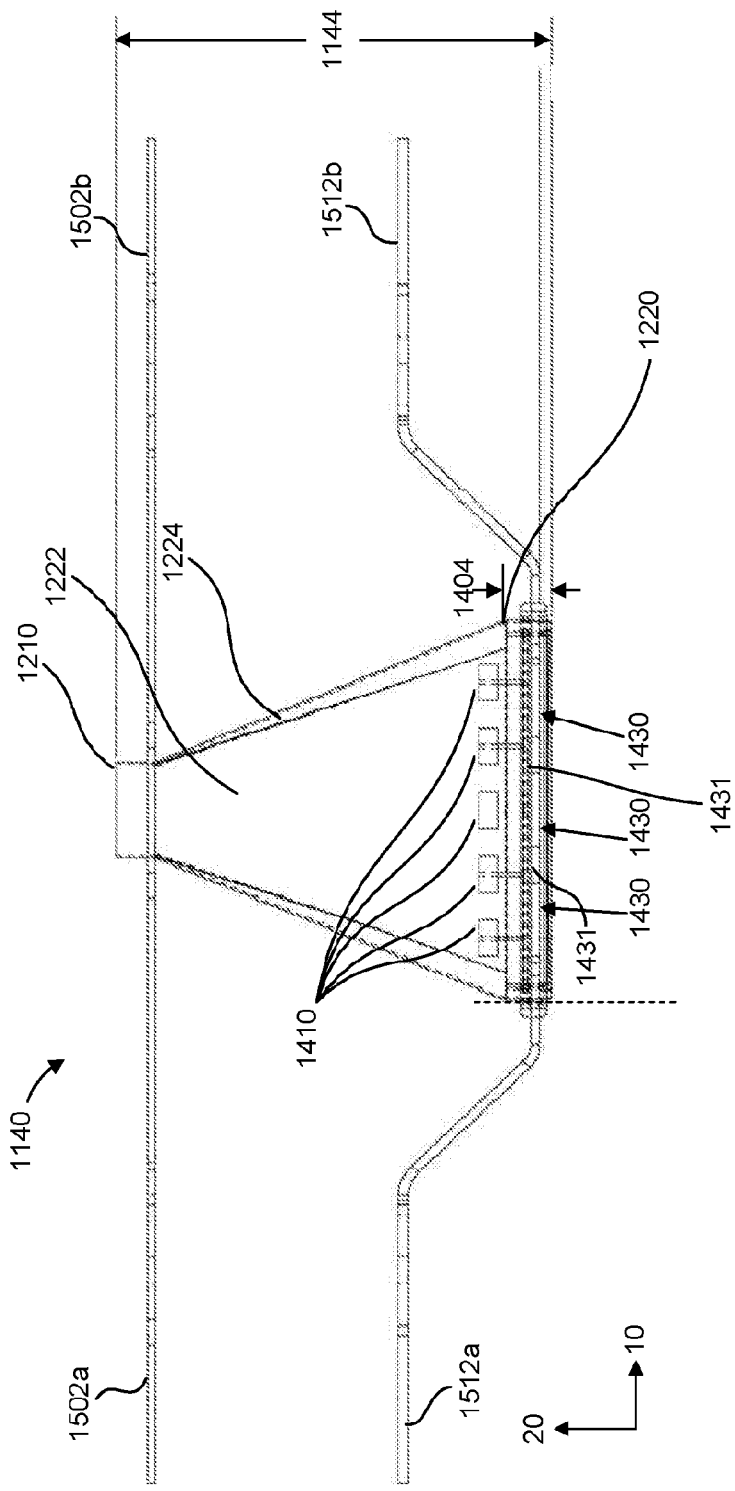
FIG. 20 is a front view of the glass forming apparatus of FIG. 19.
Figure 21:
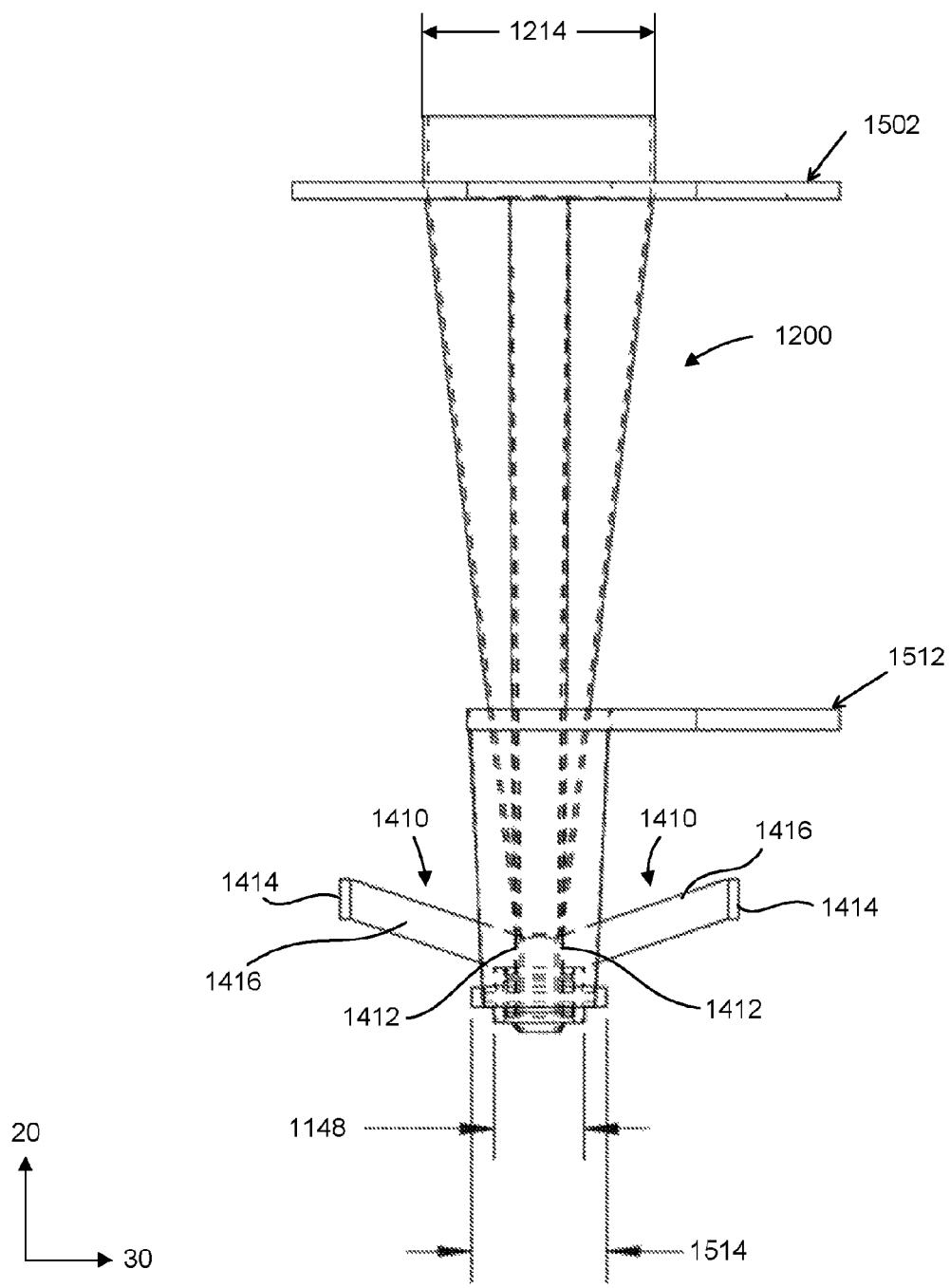
FIG. 21 is a side view of the glass forming apparatus of FIG. 19.

As shown in FIG. 19, glass former 1140 can interface with delivery pipe 139 and can deliver a glass ribbon to one or more downstream forming rolls 60 (FIG. 28), similar to glass former 140 shown in FIG. 14. Glass former 1140 can have a width 1142 extending along axis 10 (FIG. 24), a height 1144 extending along axis 20 (FIG. 20), and a dimension 1148 extending in the opening direction along axis 30 (FIG. 21). Glass former 1140 can include a transition member 1200, a slot extension 1400, struts 1410, upper ridge 1440, lower ridge 1450, upper flange 1502, and lower flange 1512.

Glass former 1140 can be formed from a material that is resistant to material deformation, i.e., creep, at high temperatures and pressures. Glass former 1140 can comprise a material suitable to deliver molten glass at a temperature of approximately 1400 degrees Celsius to approximately 1700 degrees Celsius. In some embodiments, glass former 1140 can comprise a platinum and rhodium alloy to allow glass former 1140 to be compatible with high temperature and pressure for delivering high temperature molten glass. In some embodiments, glass former 1140 can be a doped PtRh alloy. In some embodiments, glass former 1140 can be an 80% Pt 20% Rh alloy. In another embodiment, glass former 1140 can be a 90% Pt 10% Rh alloy. In further embodiments, glass former 1140 can comprise oxide dispersion hardened platinum (DPH). In a further embodiment, glass former 1140 can be a zircon doped material or other suitable PtRh alloy. In some embodiments, glass former 1140 can be an oxide dispersion-strengthened alloy. Respective portions of glass former 1140 can be different materials, as discussed in greater detail below.

In some embodiments, the viscosity of molten glass flowing through glass former 1140 can be controlled by adjusting one or more of the following: flow distance and pressure of the molten glass supply; temperature of the molten glass supply; width 1433 of slot extension orifice 1432 (FIG. 23); and orifice opening distances 1420, 1422, and 1424. The viscosity of the molten glass flowing through glass former 1140 can be from approximately 50 poises to approximately 35,000 poises. In further embodiments, the viscosity of the molten glass flowing through glass former 1140 can be from approximately 1,000 poises to approximately 5,000 poises. Viscosity of the molten glass at a position in glass former 1140 can be determined based on the temperature of glass former 1140 at that position. In some embodiments, glass former 1140 can include temperature sensors (not shown) to determine the temperature at one or more positions in glass former 1140 in order to determine the viscosity of the molten glass at those positions.

As shown in FIG. 19, transition member 1200 can be fixed to a molten glass supply via delivery pipe 139 that is attached to upper end 1210 of transition member 1200. For example, upper end 1210 can be metallurgically bonded to delivery pipe 139 by welding or brazing. As shown in FIG. 24, the molten glass can flow through transition chamber 1201 of transition member 1200 and through lower end 1220 of transition member 1200 into an interior volume 1401 of slot extension 1400. Transition member 1200 can distribute molten glass from the center of upper end 1210 across the width of lower end 1220 along axis 10. As shown in FIGS. 19-21, transition member 1200 can be tapered along its height along axis 10 and/or along axis 30. In some embodiments, transition member 1200 can have a trapezoidal shape when viewed from the front, back, or side.

As shown in FIG. 20, transition member 1200 can include transition member body portions 1222 and transition member edge portions 1224. Transition member body portions 1222 can have a relatively flat shape and can be spaced along axis 30. In some embodiments, transition member body portions 1222 can have a thickness in a range from about 20 mil to about 60 mil, such as from about 30 mil to about 50 mil. In other embodiments, transition member body portions 1222 can have a thickness of about 40 mil. Transition member edge portions 1224 can have a curved shape and can be spaced along axis 10. In some embodiments, transition member edge portions 1224 can have a thickness in a range from about 40 mil to about 80 mil, such as from about 50 mil to about 70 mil. In other embodiments, transition member edge portions 1224 can have a thickness of about 60 mil. Each transition member edge portion 1224 is attached to both transition member body portions 1222 to form transition member 1200 that surrounds transition chamber 1201. For example, transition member edge portions 1224 can be metallurgically bonded to transition member body portions 1222 by welding or brazing or by a continuous air tight weld.

In some embodiments, the transition member is configured to improve glass flow distribution and reduce pressure drop across the system by sending more glass to the edges of the transition member. A lower pressure drop can reduce operating and scale-up costs and mitigate deformation of the slot extension.

In some embodiments, the transition member comprises a transition chamber. In some embodiments, the transition chamber is defined by a first body portion, a second body portion, a first edge portion, and a second edge portion. In some embodiments, the thickness of the transition chamber at any given height of the transition chamber does not vary by more than 5% along 50% of the width of the transition chamber. In some embodiments, the thickness of the transition chamber at any given height does not vary by more than 5% across 80% of the width of the transition chamber. In some embodiments, the consistent width across a portion of the transition chamber enables more glass to flow to the edges. In some embodiments, the glass mass flow rate through the transition chamber is in the range of 85, 95, 105, 115, and 125 lbs/hr or any range defined by any two of those endpoints. In some embodiments, the mass flow rate is in the range of 95 to 115 lbs/hr.

The pressure drop along the center of the width of a transition chamber similar to that shown in FIGS. 37 and 38 was determined to be 45612 Pa. The pressure drop along the center of the width of a transition chamber similar to that shown in FIGS. 30-36 was determined to be 33055 Pa. Using the design as shown in FIGS. 30-36, in some embodiments, pressure drop can be reduced by 38%.

Slot extension 1400 can be attached to transition member lower end 1220, as shown in FIGS. 19-20. An interior volume 1401 of slot extension 400 (FIG. 24) can be in fluid communication with transition chamber 1201. Glass former 1140 can deliver glass ribbon 103 by passing molten glass through slot extension orifice 1432.

Slot extension 1400 can include a slot extension height 1404 and width 1124 (FIG. 24). In some embodiments, slot extension height 1404 can be a range from about 1 mm to about 100 mm, such as from about 10 mm to about 30 mm, such as from about 18 mm to about 22 mm. Slot extension height 404 can be about 20 mm. In some embodiments, width 1142 can be a range from about 50 mm to about 1.5 m, such as from about 50 mm to about 500 mm, such as from about 150 mm to about 300 mm.

In some embodiments, the slot extension has a smaller cross-sectional area than the transition chamber and has the highest impedance of the system. In some embodiments, between 15% and 30% of the total impedance of the system is in the slot extension.

As shown in FIG. 23, slot extension orifice 1432 can include a first end 1434 and a second end 1436 that is spaced from first end 1434 along axis 10. As such, slot extension orifice 1432 can have an orifice opening distance 1420 at a center of slot extension orifice 1432 between ends 1434 and 1436 that is smaller than the orifice opening distance 1422 at end 1434 or 1436. Ends 1434 and 1436 can be curved such that a maximum orifice opening distance 1424 is slightly larger than the orifice opening distance 1422. This variation in the orifice opening distance across slot extension orifice width 1433 can be used to compensate for the tendency of the velocity of molten glass flow to be higher in the middle of the width of the glass former. For example, a smaller orifice opening distance 1420 at a center of slot extension orifice 1432, and a maximum orifice opening distance 1424 at ends 1434 and 1436, with a curve in between, slows the molten glass velocity in the center relative to the ends. By selecting the proper variation in orifice opening distance, uniform molten glass flow density may be achieved across slot orifice width 1433.

In some embodiments, the orifice opening distance of the slot extension varies along the width of the orifice. In some embodiments, the orifice has an orifice opening distance that is smaller at the center of the slot extension than at the edges of the slot extension, which limits glass flow at the center of the slot extension. In some embodiments, variation in the orifice opening distance improves stability of the glass forming apparatus by sending more glass to the edges of the slot extension. Sending more glass to the edges of the slot extension improves the glass flow distributions and reduces glass pressure exerted on the slot extension.

In some embodiments, the orifice opening distance of the slot extension is narrowest at in the middle portion of the slot extension. In some embodiments, the orifice opening distance is widest at the first and second ends of the slot extension. In some embodiments, the orifice opening distance has a local minimum in the middle portion and two local maxima, one in the left portion and one in the right portion. In some embodiments the orifice opening distance at the two local maxima is in the range of 1%, 5%, 10%, 15% and 20%, or any range defined by any two of those endpoints, greater than the orifice opening distance at the local minimum. In some embodiments, the orifice opening distance at the local maxima is 15% greater than the orifice opening distance at the local minimum.

In some embodiments, the orifice has a peanut shape, as shown in FIG. 39. As used herein, "peanut shape" is understood to mean the orifice opening distance has a local minimum in the middle portion of the orifice, the orifice opening distance smoothly increases in both directions away from the local minimum until reaching a local maximum in each of the left and right portions of the orifice, and the orifice opening distance smoothly decreases from each local maxima to the end portions of the bottom orifice.

The orifice opening distance 1420 can be a range from about 1 mm to about 50 mm, such as from about 5 mm to about 15 mm, such as from about 9 mm to about 10 mm. In some embodiments, the orifice opening distance can be 5, 10, 15, 20, 25, 30, 35, 40, 45, and 50 mm, or any range defined by any two of those endpoints. The orifice opening distance 1422 can be a range from about 1 mm to about 20 mm, such as from about 8 mm to about 13 mm, such as from about 9 mm to about 12 mm, such as from about 10 mm to about 11 mm. The maximum orifice opening distance 1424 can be a range from about 1 mm to about 50 mm. In some embodiments, the maximum orifice opening distance can be 5, 10, 15, 20, 25, 30, 35, 40, 45, and 50 mm, or any range defined by any two of those endpoints. In some embodiments, the maximum orifice opening distance can be a range from about 10 mm to about 15 mm, such as from about 11 mm to about 14 mm, such as from about 12 mm to about 13 mm. In some embodiments the orifice opening distance is 9.5 mm at the local minimum. In some embodiments, the orifice opening distance is 10.9 mm at the local maxima.

In some embodiments, slot extension orifice width 1433 (FIG. 23) can be a range from about 50 mm to about 1.5 m, such as from about 50 mm to about 500 mm, such from as about 150 mm to about 300 mm. In some embodiments, the flow density of molten glass through slot extension orifice 1432 can be from one kilogram per centimeter per hour to approximately 36 kilograms per centimeter per hour.

As show in FIG. 19, slot extension 1400 can include struts 1410, upper ridge 1440, and lower ridge 1450 attached to the exterior surface of slot extension 1400. Struts 1410 can provide external structural reinforcement to maintain the shape of glass former 1140 and slot extension orifice 1432 over time by transmitting stress from slot extension 1400 to a rigid component (not shown), and struts 1410 help to avoid material creep at high temperature and glass pressure. Because struts 1410 are external structural reinforcements, struts 1410 do not interact with the glass stream through glass former 1140 and do not affect glass stream quality. Upper ridge 1440 and/or lower ridge 1450 can be attached to slot extension 1400 to provide additional structural rigidity to slot extension 1400 to avoid material creep at high temperature and glass pressure.

Struts 1410 may comprise a precious metal, such as a platinum group metal (platinum, rhodium, iridium, ruthenium, palladium and osmium) or alloy thereof, and in some examples may include the same precious metal as glass former 1140. For example, struts 1410 may comprise a platinum-rhodium alloy wherein the platinum comprises from about 70% to about 90% of the alloy and rhodium comprises from about 20% to about 30% of the alloy. All of struts 1410 may be formed of the same metal, or struts 1410 may include different metals. For example, struts 1410 may comprise platinum-rhodium alloys in different percentage combinations, or include other alloying materials to modify an electrical resistance of the struts 1410, to change mechanical properties of struts 1410, such as strength or hardness of struts 1410, or to obtain any other desired attributes as may be needed and attainable by alloying.

As shown in FIGS. 19, 20, and 22, one or more struts 1410 can be attached to the front and/or rear sides of slot extension 1400 adjacent to the transition member body portions 1202. Struts 1410 can be metallurgically bonded to slot extension 1400, for example by brazing or welding.

Any number of struts 1410 can be attached to the front and/or rear sides of slot extension 1400. In some embodiments, the same number of struts 1410 can be attached to each of the front side of slot extension 1400 and the rear side of slot extension 1400. In other embodiments, different number of struts 1410 can be attached to the front and rear sides of the slot extension 1400. These struts 1410 can directly oppose each other or can be alternating. In some embodiments, two or more adjacent struts 1410 can be spaced along axis 10 on slot extension 1410. In some embodiments, the number of struts 1410 attached to the front side and/or rear side of slot extension 1400 can be in a range from one strut 1410 to ten struts 1410, such as from two struts 1410 to nine struts 1410, such as from three struts 1410 to eight struts 1410, such as from four struts 1410 to seven struts 1410. In some embodiments, the number of struts 1410 attached to the front side and/or rear side of slot extension 1400 can be dependent on the width 1142 of glass former 1140. For example, glass former 1140 can utilize one strut per about every 25 mm to about 100 mm of width 1142, such as per about every 35 mm to about 75 mm, such as per about every 45 mm to about 65 mm.

As shown in FIGS. 21 and 25-27, struts 1410 can have a slot end 1412, a reinforcement end 1414, and a strut body 1416 positioned between slot end 1412 and reinforcement end 1414. Struts 1410 can include a portion 1418 that interfaces with upper ridge 1440, as discussed in greater detail below. In some embodiments, glass former 1140 can be surrounded by a refractory material 1100 (FIG. 29) such that struts 1410 are embedded in the refractory material 1100 to transmit stress from the slot extension 1400 to the refractory material 1100. The refractory material 1100 can be a refractory ceramic material such as alumina (aluminum oxide) or zirconia (zirconium oxide), although other refractory materials may be used. In some embodiments, the refractory material is formed by casting the shape using at least a portion of the outer surface of the glass former as a mold. In some examples, the refractory material 1100 can be a monolithic block of ceramic material that has been isostatically pressed and sintered, then machined into the appropriate shape. In other examples, the refractory material 1100 may be formed by joining two or more blocks of ceramic refractory material. The refractory material can include one or more precious metal components. In some embodiments, reinforcement end 1414 of struts 1410 can abut a rigid component (not shown) to transmit stress from slot extension 1400 to the rigid component.

In some embodiments, the electrical power needs to be safely delivered to maintain a constant viscosity and temperature of the molten glass. The temperature difference between the slot extension and the rollers can be significant. In some embodiments, the temperature of the slot extension is in the range of 1300, 1350, 1400, 1450, and 1500° C., or any range defined by any two of those endpoints. In some embodiments, the temperature of the rollers is about 400, 450, 500, 550, and 600° C., or any range defined by any two of those endpoints. In some embodiments, the temperature of the slot extension is 1400° C. and the temperature of the rollers is 500° C.

In some embodiments a refractory material covers the fishtail body to minimize heat loss due to the difference in temperature between the slot extension and the rollers. In some embodiments, the refractory material maintains the molten glass with constant viscosity and temperature. As shown in FIGS. 33 and 34, a large portion of the transition member is covered by the refractory material. In some embodiments, the entire transition member is covered by the refractory material The slot extension is designed to deliver uniform glass as close as possible to the rollers. Due to the limited space between rollers, a portion of the slot extension is not covered by the refractory material.

In some embodiments, at least 1 mm of the slot extension is not covered by the refractory material. In some embodiments, at least 1 mm of the slot extension is covered by the refractory material. In some embodiments, up to 150 mm of the slot extension is covered by the refractory material. A refractory material covering 150 mm of the slot extension is used in conjunction with rollers having a diameter of 100 mm. The amount of the slot extension covered by the refractory material is dependent on the diameter of rollers used and may increase with larger rollers or decrease with smaller rollers.

Reinforcement end 1414 can have an enlarged surface area as compared to the end of strut body 1416. The enlarged surface area of reinforcement end 1414 can anchor struts 1410 in a refractory material and/or reduce a local stress concentration when reinforcement end 1414 abuts a rigid component. As shown in FIGS. 26-27, reinforcement end 1414 can have an end length 1415L along axis 10, an end width 1415W, and an end thickness 1415T. In some embodiments, end length 1415L can be in a range from about 20 mm to about 30 mm, such as from about 22 mm to about 28 mm, such as from about 24 mm to about 26 mm. In some embodiments, end width 1415W can be a range from about 8 mm to about 16 mm, such as from about 10 mm to about 14 mm. In some embodiments, end thickness 1415T can be a range of from about one mm to about five mm, such as from about two mm to about four mm.

As shown in FIGS. 26-27, struts 1410 can have a strut length 1410L along axis 30, a strut width 1410W, and a strut thickness 1410T. In some embodiments, strut length 1410L can be in a range of from about 20 mm to about 80 mm, such as from about 30 mm to about 70 mm, such as from about 40 mm to about 60 mm. In some embodiments, strut width 1410W can be in a range of from about eight mm to about 14 mm, such as from about nine mm to about 13 mm, such as from about 10 mm to about 12 mm. Strut thickness 1410T (FIG. 27) can be in a range of from about one mm to about five mm, such as from about two mm to about four mm.

Struts 1410 can extend outward from the front side and/or the back side of slot extension 1400, generally along axis 30. In some embodiments, struts 1410 can be angled upward from axis 30 at a strut angle 1417. Strut angle 1417 can be in a range of from about zero degrees to about 40 degrees, such as from about 10 degrees to about 30 degrees. Strut angle 1417 can be about 20 degrees.

In some embodiments, the struts are used to mitigate deformation of the slot extension. Reducing deformation ensures a more uniform cross-sectional area, which can reduce the pressure drop across the transition chamber.

In some embodiments, the struts mitigate deformation and widening of the center of the slot extension, which enhances process stability. In some embodiments, the struts are welded to the slot extension near where the slot extension is connected to the transition member. In some embodiments, the struts compress the slot extension to prevent deformation without requiring the use of internal nails and the pressure tank.

Upper ridge 1440 and lower ridge 1450 are shown in FIGS. 19 and 26. Upper ridge 1440 and lower ridge 1450 can have a structural tee shape. Upper ridge 1440 and/or lower ridge 1450 can be attached to slot extension 1400 to provide additional structural rigidity to slot extension 1400 to avoid material creep at high temperature and glass pressure. In some embodiments, upper ridge 1440 and/or lower ridge 1450 can surround exterior portions of slot extension 1400. Upper ridge 1440 and/or lower ridge 1450 can be metallurgically bonded to slot extension 1400, for example by brazing or welding. In some embodiments, upper ridge 1440 and/or lower ridge 1450 can be integrally formed with slot extension 1400.

Upper ridge 1440 and/or lower ridge 1450 may comprise a precious metal, such as a platinum group metal (platinum, rhodium, iridium, ruthenium, palladium and osmium) or alloy thereof, and in some examples may include the same precious metal as glass former 1140. For example, upper ridge 1440 and/or lower ridge 1450 may comprise a platinum-rhodium alloy wherein the platinum comprises from about 70% to about 90% of the alloy and rhodium comprises from about 20% to about 30% of the alloy. All of upper ridge 1440 and/or lower ridge 1450 may be formed of the same metal, or upper ridge 1440 and/or lower ridge 1450 may include different metals. For example, upper ridge 1440 and/or lower ridge 1450 may comprise platinum-rhodium alloys in different percentage combinations, or include other alloying materials to modify an electrical resistance of the upper ridge 1440 and/or lower ridge 1450, to change mechanical properties of upper ridge 1440 and/or lower ridge 1450, such as strength or hardness of upper ridge 1440 and/or lower ridge 1450, or to obtain any other desired attributes as may be needed and attainable by alloying.

As shown in FIGS. 20 and 26, upper ridge 1440 can be connected to lower ridge 1450 along axis 20 by one or more bars 1430. Bars 1430 can provide additional structural reinforcement to slot extension 1400 to avoid material creep at high temperature and glass pressure. Two or more adjacent bars 1430 can be spaced along axis 10 by an opening 1431 between upper ridge 1440 and lower ridge 1450.

Portion 1418 of struts 1410 can interface and overlap with the top portion of upper ridge 1440, as shown in FIG. 26. This interface can position struts 1410 on slot extension 1400 to assist with manufacture and can provide additional structural rigidity to slot extension 1400 to avoid material creep at high temperature and glass pressure.

In some embodiments, glass former 1140 can deliver glass ribbon 103 for further processing. In other embodiments, glass former 1140 can be utilized with a vertical rolling process and can supply glass ribbon 103 to a pair of forming rolls 60 for further processing of glass ribbon 103, as shown in FIG. 28. The pair of forming rolls 60 can be conventional hot forming rolls that are temperature controlled at a surface temperature in a range from about 500 degrees Celsius to about 600 degrees Celsius, or higher, depending on the composition and viscosity of the glass being formed. Processes and devices for the temperature control of forming rolls are well understood in the art and are therefore not described in detail herein.

Strut angle 1417 can allow slot extension 1400 can deliver glass ribbon 103 as low as possible between the pair of forming rolls 60 to prevent instability in the flow of glass ribbon 103. For example, the diameter of rolls 60 can be large enough that rolls 60 extend beyond a plane formed by the bottom of slot extension 1400 so a stable flow of glass ribbon 103 can be provided to rolls 60. As shown in FIG. 28, glass ribbon 103 can exit slot extension 1400 and accumulate on a top portion of rolls 60 to form a glass ribbon puddle 103'. The pair of forming rolls 60 can flatten, thin, and smooth the glass ribbon puddle 103' into pressed glass ribbon 103". The thickness of glass ribbon 103 can be greater than the thickness of pressed glass ribbon 103". The thickness of glass ribbon puddle 103' can be greater than the thickness of glass ribbon 103.

As shown in FIG. 19, glass former 1140 can include upper flange 1502 and lower flange 1512. The upper flange 1502 and lower flange 1512 can be in electrical communication with an electric current source, and can include electrode portions that deliver the electric current to flanges 1502 and 1512 from the electric current source. In some embodiments, upper flange 1502 and lower flange 1512 can provide direct electrical input into glass former 1140 resulting in direct resistance heating of glass former 1140. That is, upper flange 1502 and lower flange 1512 can establish an electric current in glass former 1140 that heats glass former 1140 and therefore the molten glass within glass former 1140. Heating of glass former 1140 can maintain the molten glass stream flowing at a substantially constant temperature depending upon the desired viscosity. It should be noted that the current, and therefore the heating, can be controlled, for example by a controller and temperature sensors (not shown). In some embodiments, upper flange 1502 and lower flange 1512 can distribute current uniformly about the glass former 1140 to prevent hot spots that may lead to uneven heating of the molten glass therein and possible damage to glass former 1140. Direct heating of a glass vessel using a flange is discussed in International Application No. PCT/US16/23006, which is incorporated herein by reference in its entirety.

The upper flange 1502 and lower flange 1512 can be configured such that the electric current supplied to the flanges is separately controllable to produce zones of different temperatures along glass former 1140. It should be apparent that such zones of different temperatures could be established in any one or more locations along the metallic components of glass former 1140.

Upper flange 1502 and/or lower flange 1512 may comprise a precious metal, such as a platinum group metal (platinum, rhodium, iridium, ruthenium, palladium and osmium), nickel, or alloy thereof, and in some examples may include the same precious metal as glass former 1140. For example, upper flange 1502 and/or lower flange 1512 may comprise a platinum-rhodium alloy wherein the platinum comprises from about 70% to about 90% of the alloy and rhodium comprises from about 20% to about 30% of the alloy. All of upper flange 1502 and/or lower flange 1512 may be formed of the same metal, or upper flange 1502 and/or lower flange 1512 may include different metals. For example, upper flange 1502 and/or lower flange 1512 may comprise platinum-rhodium alloys in different percentage combinations, or include other alloying materials to modify an electrical resistance of the upper flange 1502 and/or lower flange 1512, to change mechanical properties of upper flange 1502 and/or lower flange 1512, such as strength or hardness, or to obtain any other desired attributes as may be needed and attainable by alloying.

Upper flange 1502 can be positioned adjacent transition member upper end 1210. Upper flange 1502 can include an upper flange first portion 1502a extending generally along axis 10 along a first side of glass former 1140, an upper flange second portion 1502b extending along a second side of glass former 1140, and an upper flange middle portion 1502c that surrounds a portion of transition member 1200 adjacent transition member upper end 1210. Upper flange 1502 can be metallurgically bonded to transition member 1200, for example by brazing or welding. As shown in FIG. 24, upper flange 1502 can include channels 1506 between portions 1504 to alter the cross-sectional area and provide for a modified electric current resistance in upper flange 1502.

Lower flange 1512 can be positioned adjacent slot extension 1400. Lower flange 1512 can be metallurgically bonded to slot extension 1400, for example by brazing or welding. Lower flange 1512 can include a lower flange first portion 1512a extending generally along axis 10 along a first side of glass former 1140 and a lower flange second portion 1512b extending along a second side of glass former 1140. Lower flange first portion 1512a and lower flange second portion 1512b can attach to slot extension 1400 via lower flange connection portion 1512c. Lower flange connection portion 1512c can be positioned within upper ridge 1440 and lower ridge 1450. As shown in FIG. 24, lower flange 1512 can include channels 1516 between portions 1514 to alter the cross-sectional area and provide for a modified electric current resistance in lower flange 1512.

The upper flange first portion 1502a, the upper flange second portion 1502b, the lower flange first portion 1512a, and the lower flange second portion 1512b can each be in electrical communication with an electric current source, and can include electrode portions that deliver the electric current to the respective portions 1502a, 1502b, and 1512a, 1512b from the power source. In some embodiments, upper flange first portion 1502a, the upper flange second portion 1502b, the lower flange first portion 1512a, and the lower flange second portion 1512b can provide direct electrical input into glass former 1140 resulting in direct heating of the molten glass. Together with transition member body portions 1222, transition member edge portions 1224, and slot extension 1400, the upper flange first portion 1502a, the upper flange second portion 1502b, the lower flange first portion 1512a, and the lower flange second portion 1512b can establish an electric current in glass former 1140 that heats the vessel and therefore the molten glass within the vessel. Heating of glass former 1140 can maintain the glass stream flowing within at a substantially constant temperature depending upon the desired viscosity.

In some embodiments, the lower flange is connected to the slot extension by a U-shaped clamp. The U-shaped clamp design improves current distribution in the slot extension and directs more current to the slot extension.

As shown in FIGS. 41 and 42, in some embodiments the U-shaped clamp design connects the bottom flange and the slot extension. The U-shaped clamp design provides a larger surface area of contact between the bottom flange and the slot extension. The greater surface area improves the current density distribution in the connection region and directs more current to the slot extension. Using the U-shaped clamp design, the current distribution in the connection region is more uniform, reducing local spots of high current density. In addition, the U-shaped clamp design allows high operating amps conditions.

To provide additional control over electrical currents provided to embodiments described herein and/or to control viscosity of glass materials, in some embodiments, transition member edge portions 1224 can be thicker than transition member body portions 1222, e.g., about 60 mil and about 40 mil, respectively. In some embodiments, transition member edge portions 1224 can be a range of about 25% to about 75% thicker than transition member body portions 1222, such as about 35% to about 65% thicker than transition member body portions 1222, such as about 45% to about 55% thicker than transition member body portions 1222. In some embodiments the thickness of the edge portions is in the range of 50 mil, 55 mil, 60 mil, 65 mil, and 70 mil, or any range defined by any two of those endpoints. In some embodiments, the thickness of the body portions is in the range of 30 mil, 35 mil, 40 mil, 45 mil, and 50 mil, or any range defined by any two of those endpoints. In some embodiments, the thickness of the edge portions is 60 mil. In some embodiments, the thickness of the body portions is 40 mil. In some embodiments, the edge portions are 20 mil thicker than the body portions. The thicker transition member edge portions 1224 can present an increased cross-sectional area and therefore provide for a reduced electric current resistance. In some embodiments, bars 1430 positioned between upper ridge 1440 and lower ridge 1450 on slot extension 1400 (FIGS. 20 and 26) can present an increased cross-sectional area and therefore provide for a reduced electric current resistance.

In some embodiments, the variable thickness of the walls of the transition member improves the glass temperature distributions by improving the current distribution. In some embodiments, the variable wall thickness reduces concentrations of power in the walls, which avoids hot spots and reduces the glass temperature in the edge portions. In some embodiments, the variable wall thickness enables uniform power distribution and uniform glass temperature, which avoids hot-spots.

In some embodiments, the edge portions are thicker than the body portions, which strengthens the transition member and improves the current density distribution throughout the transition member. In some embodiments, the current density is uniform. In some embodiments, the current density is in the range of 4, 5, 6, 7, 8, 9, 10, 11, 12, 13, and 15 A/mm$^2$ or any range defined by any two of those endpoints. In some embodiments, the current density is in the range of 8 to 11 A/mm$^2$. In some embodiments, the current density is in the range of 6 to 9 A/mm$^2$.

Upper flange first portion 1502a, upper flange second portion 1502b, upper flange third portion 1502c, lower flange first portion 1512a, and lower flange 1512b can be configured such that the electric current supplied to the flanges is separately controllable to produce zones of different temperatures along glass former 1140. It should be apparent that such zones of different temperatures could be established in any one or more locations along the metallic components of the downstream glass manufacturing apparatus.

In some embodiments, upper flange first portion 1502a, upper flange second portion 1502b, and upper flange third portion 1502c can create a first zone for direct heating of glass former 1140. Upper flange first portion 1502a, a transition member edge portion 1224, slot extension 1400, and lower flange first portion 1512a can create a second zone for direct heating of glass former 1140. Upper flange second portion 1502b, a transition member edge portion 1224, slot extension 1400, and lower flange second portion 1512b can create a third zone for direct heating of glass former 1140. Lower flange first portion 1512a, slot extension 1400, and lower flange second portion 1512b can create a fourth zone for direct heating of glass former 1140.

In some embodiments, a glass former can include any combination of the features described herein, including but not limited to: upper transition member 200, pressure tank 300, upper pressure tank supports 326, lower pressure tank supports 336, slot extension 400, heat source 420, refractory material 1100, transition member 1200, slot extension 1400, struts 1410, bars 1430, upper ridge 1440, lower ridge 1450, upper flange 1502, and/or lower flange 1512.

In some embodiments, the transition member of the glass forming apparatus is a fishtail system that efficiently delivers molten glass to a vertical rolling process in the downstream. As shown in FIGS. 19-22, the glass forming apparatus consists of transition member 1200, upper flange 1502, lower flange 1512, and slot extension 1400. In some embodiments, a refractory material covers at least a portion of the transition member. In some embodiments, the transition member is made of platinum. In some embodiments, the flanges are made of platinum. In some embodiments, the refractory material covers 75% to 100% of the fishtail body.

In some embodiments, there is a need to mitigate deformation of the slot extension and maintain control of the glass mass flow distribution at the slot extension. In some embodiments, there is a need to deliver electrical power to the transition member safely and efficiently. Mitigating deformation of the slot extension and delivering power safely and efficiently are highly coupled because the electrical power distribution impacts the glass temperature and viscosity, which in turn impacts glass mass distribution. Hot spots occur when there are concentrations of power within the walls of the transition member. If the operating current is too high, the body of the transition member may become overheated, which can cause hot spots. In contrast, if the current is too low, the slot extension is not provided with sufficient power, which can lead to the glass becoming cool and more viscous.

In some embodiments, the glass forming apparatus improves and maintains stable glass flow distribution, achieves a uniform glass temperature as the glass exits the slot extension, and safely directs electrical power for heating operations without generating hot spots.

A simulation was run incorporating features such as the transition member shown in FIGS. 30-36, the peanut shaped orifice as shown in FIG. 39, the variable wall thickness shown in FIG. 40, and the U-shaped clamp shown in FIGS. 41 and 42. Using these features, it was possible to control the temperature at the slot extension by appropriately selecting amps and volts. In some embodiments, the temperature distribution was uniform across the slot extension. In some embodiments, the temperature distribution across the slot extension was in the range of 1417 to 1425° C. In some embodiments, the average temperature variation across the slot extension was less than 10° C.

In some embodiments, the glass forming apparatus is capable of producing glass at a temperature of 1421° C. and at a rate of 1050 pounds per hour. Further, in some embodiments, the average temperature varies by less than 4° C. as the glass moves through the transition chamber. In some embodiments, the average glass temperature varies by less than 1° C. as glass moves through the transition chamber.

In some embodiments, the glass forming apparatus includes a transition member with platinum walls of varying thickness, a U-shaped member to connect to the lower flange, a peanut shaped slot extension, and a transition member with a thickness that does not vary by more than 5% across 50% of the width of the transition member at any given height, and a refractory material that covers at least a portion of the transition member. Such a configuration can enable uniform current density, glass temperature, and flow rate.

FIG. 30 shows a front-right perspective view of an exemplary glass forming apparatus. Glass forming apparatus 3000 comprises slot extension 3010 and transition member 3020. Slot extension 3010 comprises first slot wall 3011, second slot wall 3012, first slot end 3013, and second slot end 3014. Transition member 3020 comprises first body portion 3021, second body portion 3022, first edge portion 3023, and second edge portion 3024. First body portion 3021 is connected to first slot wall 3011, second body portion 3022 is connected to second slot wall 3012, first edge portion 3023 is connected to first slot wall 3013, and second edge portion 3024 is connected to second slot wall 3014.

FIG. 31 shows a front view of glass forming apparatus 3000. FIG. 32 shows a right side view of glass forming apparatus 3000. Glass forming apparatus 3000 has a height, h, a width, w, and a thickness, t. The thickness, t, of transition member 3020 increases monotonically as a function of height, h, as the distance from slot extension 3010 increases in the height direction. The width, w, of transition member 3020 decreases monotonically as a function of height as the distance from slot extension 3010 increases in the height direction.

FIG. 33 shows a front view of glass forming apparatus 3000 covered by refractory material 3300. FIG. 34 shows a right side view of glass forming apparatus 3000 covered by refractory material 3300. As shown in FIGS. 33 and 34, upper portion of the slot extension 3016 is covered by the refractory material, and lower portion of the slot extension 3015 is not covered by the refractory material.

In some embodiments, the transition member is made of platinum. In some embodiments, the transition member is heated directly by a 3-phase alternative current (AC).

FIG. 35 shows a top view of glass forming apparatus 3000. FIG. 36 shows a bottom view of glass forming apparatus 3000. In some embodiments, first edge portion 3023 and second edge portion 3024 are curved such that transition member 3020 has a convex shape where transition member 3020 is defined by first edge portion 3023 and second edge portion 3024.

In some embodiments, the thickness of the transition chamber at any given height does not vary by more than 5% across 50% of the width of the transition chamber at that height. FIG. 37 shows glass forming apparatus 3700 that has a thickness that varies by more than 5% across 50% of the width of the transition chamber. FIG. 38 shows a cross-sectional view of the transition chamber of glass forming apparatus 3700. As shown in FIG. 38, the thickness of the transition chamber varies within the middle 50% of the width of the transition chamber. The thickness at the thickest point, $t_2$, is more than 5% thicker than the thickness at $t_1$.

FIG. 39 shows a schematic of bottom orifice 3017 of the slot extension 3010. In some embodiments, bottom orifice 3017 has a thickness $T_1$ at local minimum 3018 and a thickness $T_2$ at local maximum 3019. In some embodiments, bottom orifice 3017 has a local minimum in middle portion 3910 and two local maxima, one in left portion 3900 and one in right portion 3920. In some embodiments, bottom orifice 3017 has a peanut shape.

FIG. 40 shows a top-down schematic of a portion of glass forming apparatus 3000. In some embodiments, first body portion 3021 and second body portion 3022 have a thickness $T_3$, and first edge portion 3023 and second edge portion 3024 have a thickness $T_4$. In some embodiments, the $T_3$ and $T_4$ are different. As shown in FIG. 40, in some embodiments, $T_4$ is larger than $T_3$.

FIG. 41 shows a perspective view of lower flange 4100. In some embodiments, lower flange 4100 has a U-shaped end that engages with end portion 3013 of slot extension 3010. FIG. 42 shows bottom view of lower flange 4100 engaged with slot extension 3010.

The term "or," as used herein, is inclusive; more specifically, the phrase "A or B" means "A, B, or both A and B." Exclusive "or" is designated herein by terms such as "either A or B" and "one of A or B," for example. The indefinite articles "a" and "an" and the definite article "the" to describe an element or component means that one or at least one of these elements or components is present, unless otherwise stated in specific instances.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about."

As used herein the term "uniform" is used to indicate little to no variation, allowing for variations up to 10% due to normal operating conditions or equipment limitations.

As used herein the term "linear" or "linearly" is meant to include a straight line or a nearly straight line that deviates from straight by less than 5%.

Directional terms as used herein—for example up, down, right, left, front, back, top, bottom—are made only with reference to the figures as drawn and are not intended to imply absolute orientation.

As used herein the term "glass" is meant to include any material made at least partially of glass, including glass and glass-ceramics.

The term "wherein" is used as an open-ended transitional phrase, to introduce a recitation of a series of characteristics of the structure.

As used herein, "comprising" is an open-ended transitional phrase. A list of elements following the transitional phrase "comprising" is a non-exclusive list, such that elements in addition to those specifically recited in the list may also be present.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of such teachings and guidance.

The breadth and scope of the present disclosure should not be limited by any of the above-described exemplary embodiments, but should be defined only in accordance with the following claims and their equivalents.

What is claimed is:

1. A glass forming apparatus comprising:
a transition member including a transition chamber;
a slot extension attached to a bottom portion of the transition member such that an interior volume of the slot extension is in fluid communication with the transition chamber; and
a mechanical reinforcement chosen from one of a first strut, a ridge, or combinations thereof; the mechanical reinforcement being attached to an exterior surface of the slot extension,
wherein: the transition chamber and an upper portion of the slot extension are covered by a refractory material; and a lower portion of the slot extension is not covered by a refractory material, and
wherein the mechanical reinforcement comprises a plurality of struts and the plurality of struts are embedded in the refractory material.

2. The glass forming apparatus of claim 1, wherein the mechanical reinforcement is the first strut attached to a first exterior surface of the slot extension and extending outward from the first exterior surface.

3. The glass forming apparatus of claim 1, wherein the lower portion has a height of at least 1 mm.

4. The glass forming apparatus of claim 1, wherein:
a bottom portion of the slot extension comprises a bottom orifice, the bottom orifice having an orifice opening distance that varies along a width of the orifice.

5. The glass forming apparatus of claim 4, wherein:
the orifice opening distance has a local minimum in a middle portion of the bottom orifice;
the orifice opening distance increases in a first direction moving away from the local minimum along the width of the orifice to a first local maximum in a first end portion of the bottom orifice;
the orifice opening distance increases in a second direction moving away from the local minimum along the width of the orifice to a second local maximum in a second end portion of the bottom orifice.

6. The glass forming apparatus of claim 1, further comprising a lower flange and an upper flange configured to run current through the transition member, wherein the transition member comprises walls with variable thickness.

7. The glass forming apparatus of claim 6, wherein the transition member comprises walls with variable thickness configured to maintain glass temperature in the transition chamber via resistive heating such that average glass temperature varies by less than 1° C. as glass moves through the transition chamber.

8. The glass forming apparatus of claim 6, wherein the lower flange comprises a U-shaped end engaged with an end portion of the slot extension.

9. A process for forming a glass ribbon using the glass forming apparatus of claim 1, the process comprising the steps of:
supplying a stream of molten glass through the transition chamber of the transition member;
passing the molten glass stream into the slot extension; and
drawing a glass ribbon from the slot extension.

10. A glass forming apparatus comprising:
a transition member including a transition chamber;
a slot extension attached to a bottom portion of the transition member such that an interior volume of the slot extension is in fluid communication with the transition chamber; and
a mechanical reinforcement chosen from one of a first strut, a ridge, or combinations thereof; the mechanical reinforcement being attached to an exterior surface of the slot extension,
wherein:
the slot extension is defined by:
a first slot wall and a second slot wall in the direction of a slot width, and a first slot end and a second slot end in the direction of a slot thickness;
the transition chamber is defined by:
a first body portion connected to the first slot wall along a width of the slot and extending upward from the slot;
a second body portion connected to the second slot wall along the width of the slot and extending upward from the slot;
a first edge portion connected to the first slot end along a thickness of the slot and extending upward from the slot; and
a second edge portion connected to the second slot end along the thickness of the slot and extending upward from the slot;
wherein the first body portion is connected to the second body portion at a first end by the first edge portion, and the first body portion is connected to the second body portion at a second end by the second edge portion;
a thickness of the transition chamber at a first predetermined height is a maximum distance between the first and second body portions in a thickness direction at that height;
the thickness of the transition chamber increases as a function of height as distance from the slot increases in a height direction;

a width of the transition chamber at a second predetermined height is the maximum distance between the first and second edge portions in the width direction at that height;

the width of the transition chamber decreases as a function of height as distance from the slot increases in the height direction; and the thickness of the transition chamber at any given height of the transition chamber does not vary by more than 5% along 50% of the width of the transition chamber at that height.

11. The glass forming apparatus of claim 10, wherein the first body portion and the second body portion each have a thickness that is less than a thickness of each of the first edge portion and second edge portion.

12. A process for forming a glass ribbon using the glass forming apparatus of claim 10, the process comprising the steps of:

supplying a stream of molten glass through the transition chamber of the transition member;

passing the molten glass stream into the slot extension; and drawing a glass ribbon from the slot extension.

\* \* \* \* \*

UNITED STATES PATENT AND TRADEMARK OFFICE
CERTIFICATE OF CORRECTION

PATENT NO. : 10,899,650 B2  
APPLICATION NO. : 16/098298  
DATED : January 26, 2021  
INVENTOR(S) : Gilbert De Angelis et al.

Page 1 of 1

It is certified that error appears in the above-identified patent and that said Letters Patent is hereby corrected as shown below:

On the Title Page

On page 2, in Column 2, item (56), Other Publications, Line 8, delete "Aurthority;" and insert -- Authority; --, therefor.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*